US012561328B2

(12) United States Patent
Cordes-Andersen et al.

(10) Patent No.: US 12,561,328 B2
(45) Date of Patent: Feb. 24, 2026

(54) EXTERNAL SERVICES IN DISTRIBUTED DATABASES

(71) Applicant: CrowdStrike, Inc., Sunnyvale, CA (US)

(72) Inventors: Kristian Cordes-Andersen, Aarhus (DK); Allan Stisen, Lystrup (DK)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/586,742

(22) Filed: Feb. 26, 2024

(65) Prior Publication Data

US 2025/0272292 A1    Aug. 28, 2025

(51) Int. Cl.
| | |
|---|---|
| *G06F 16/2455* | (2019.01) |
| *G06F 16/23* | (2019.01) |
| *G06F 16/25* | (2019.01) |
| *G06F 16/27* | (2019.01) |

(52) U.S. Cl.
CPC ...... *G06F 16/2455* (2019.01); *G06F 16/2358* (2019.01); *G06F 16/2379* (2019.01); *G06F 16/254* (2019.01); *G06F 16/27* (2019.01)

(58) Field of Classification Search
CPC .... G06F 16/2455; G06F 16/27; G06F 16/254; G06F 16/2471; G06F 16/245; G06F 16/2228; G06F 16/244
USPC ........................................................ 707/770
See application file for complete search history.

(56) References Cited

U.S. PATENT DOCUMENTS

| | | | | |
|---|---|---|---|---|
| 9,130,920 | B2 | 9/2015 | Pelykh | |
| 9,268,716 | B2 | 2/2016 | Natkovich et al. | |
| 11,797,447 | B2 | 10/2023 | Ou et al. | |
| 2008/0183656 | A1* | 7/2008 | Perng ...................... | G06F 16/20 |
| 2011/0191316 | A1* | 8/2011 | Lai ...................... | G06F 16/9535 |
| | | | | 707/706 |
| 2016/0112344 | A1* | 4/2016 | Chen ...................... | H04L 47/80 |
| | | | | 709/225 |
| 2016/0182467 | A1* | 6/2016 | Hang .................. | H04L 63/0464 |
| | | | | 713/153 |
| 2017/0017678 | A1* | 1/2017 | Agrwal .................. | G06F 16/21 |
| 2019/0220620 | A1* | 7/2019 | Hahn .................. | H04L 63/0428 |
| 2019/0258632 | A1* | 8/2019 | Pal ...................... | G06F 16/2455 |
| | | | | 707/770 |

(Continued)

FOREIGN PATENT DOCUMENTS

| | | |
|---|---|---|
| CN | 102917009 | 2/2013 |
| CN | 115174649 | 10/2022 |

*Primary Examiner* — Shahid A Alam
(74) *Attorney, Agent, or Firm* — Law Office of Scott P. Zimmerman, PLLC

(57) ABSTRACT

Computer nodes associated with a cluster store a distributed database. As the cluster provides a distributed database service, some or all of the nodes may interface with one or more external services. The external services may be specified by a service agreement, or the external services may be dynamically specified by a user/customer of the distributed database service. The external services may be available to any node of the cluster, or the external services may only be accessible to particular nodes and/or to particular cluster/service roles. In a mapreduce database framework, for example, the external services may be restricted to reducer/coordinator nodes. Whichever nodes are permitted, the nodes may use remote procedure calls to access external services.

20 Claims, 20 Drawing Sheets

(56) References Cited

U.S. PATENT DOCUMENTS

| | | | |
|---|---|---|---|
| 2020/0050607 A1* | 2/2020 | Pal .................... | G06F 16/24549 |
| 2024/0004867 A1* | 1/2024 | Pandis ................. | G06F 16/254 |
| 2024/0005025 A1* | 1/2024 | White ................ | G06F 16/2458 |

* cited by examiner

Figure 6:
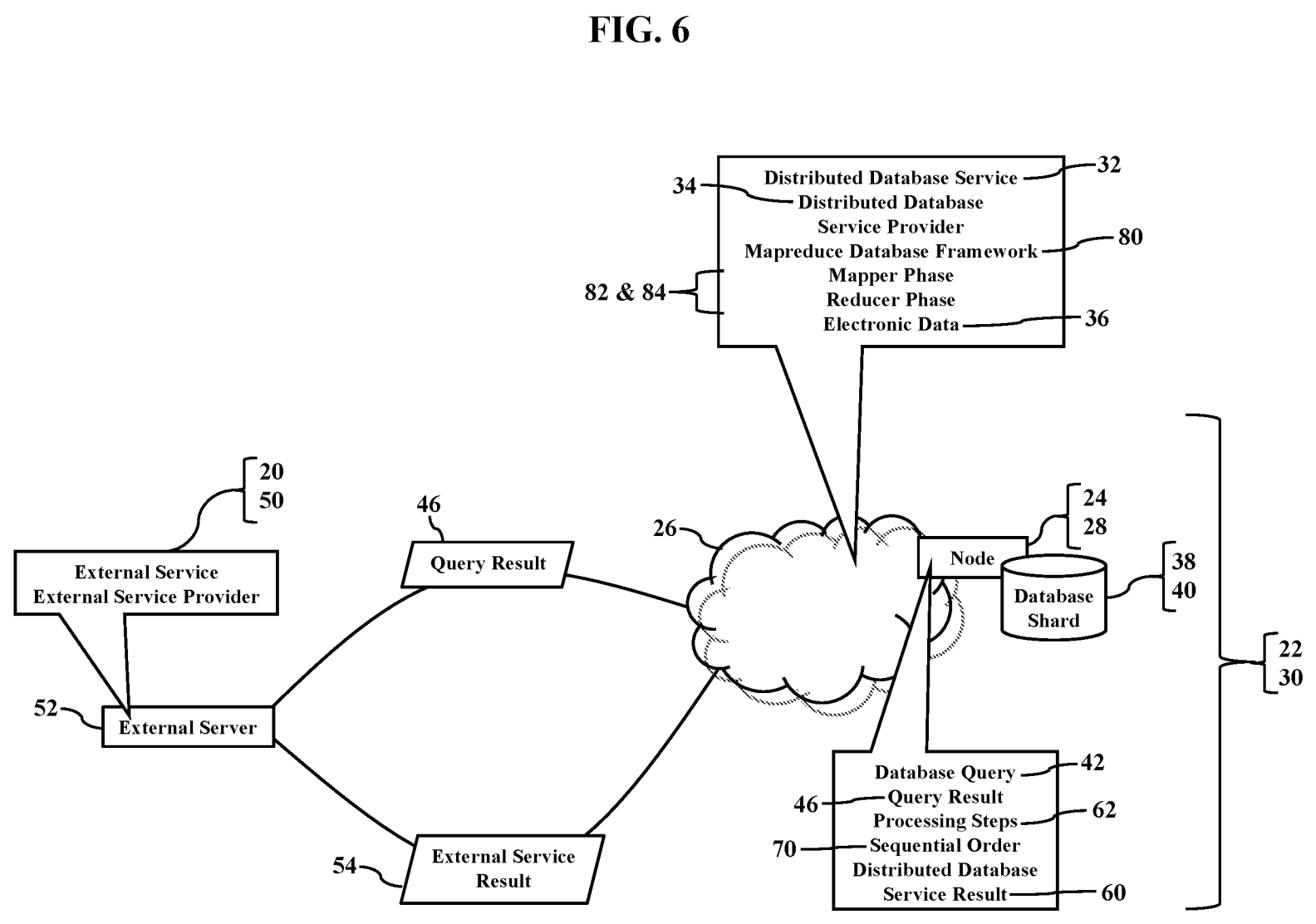

Distributed Database Service — 32
Distributed Database Service Provider — 80
Mapreduce Database Framework
Mapper Phase
Reducer Phase
Electronic Data — 36

34

82 & 84

22
30

Node
24
28

Database Shard
38
40

Database Query — 42
Query Result — 62
Processing Steps
Sequential Order
Distributed Database Service Result — 60
46
70

26

Query Result — 46

External Service Result — 54

External Service
External Service Provider
20
50

External Server — 52

FIG. 8

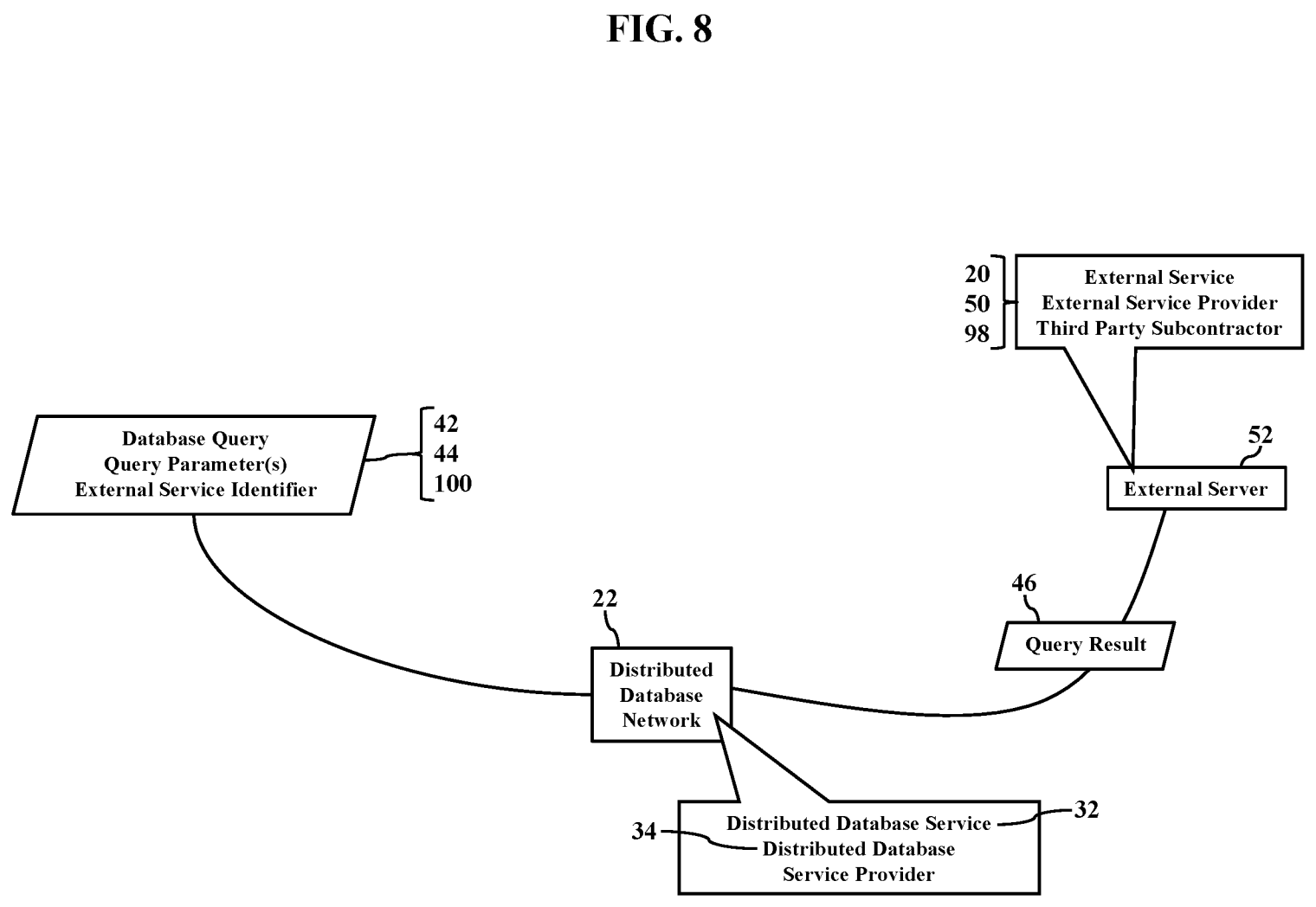

External Service    20
External Service Provider    50
Third Party Subcontractor    98

52
External Server

46    Query Result

22    Distributed Database Network

Distributed Database Service    32
Distributed Database Service Provider
34

Database Query    42
Query Parameter(s)    44
External Service Identifier    100

FIG. 17

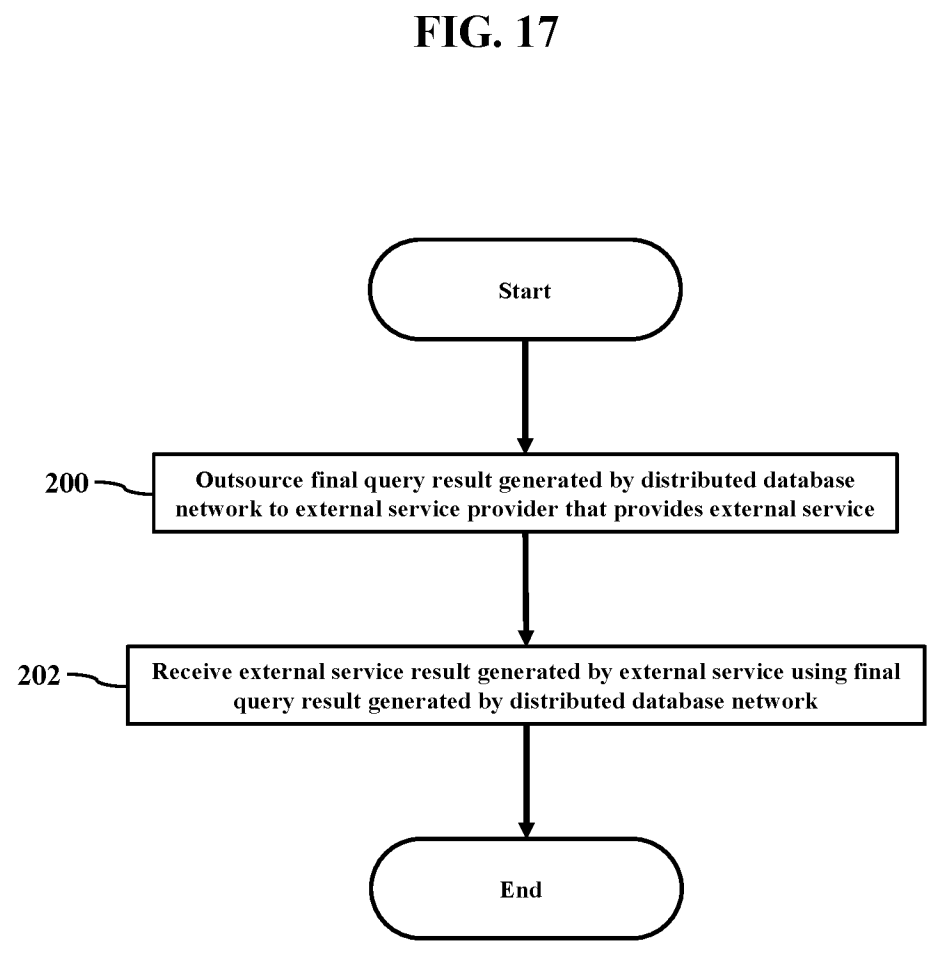

Start

200 — Outsource final query result generated by distributed database network to external service provider that provides external service 202 — Receive external service result generated by external service using final query result generated by distributed database network End

FIG. 18

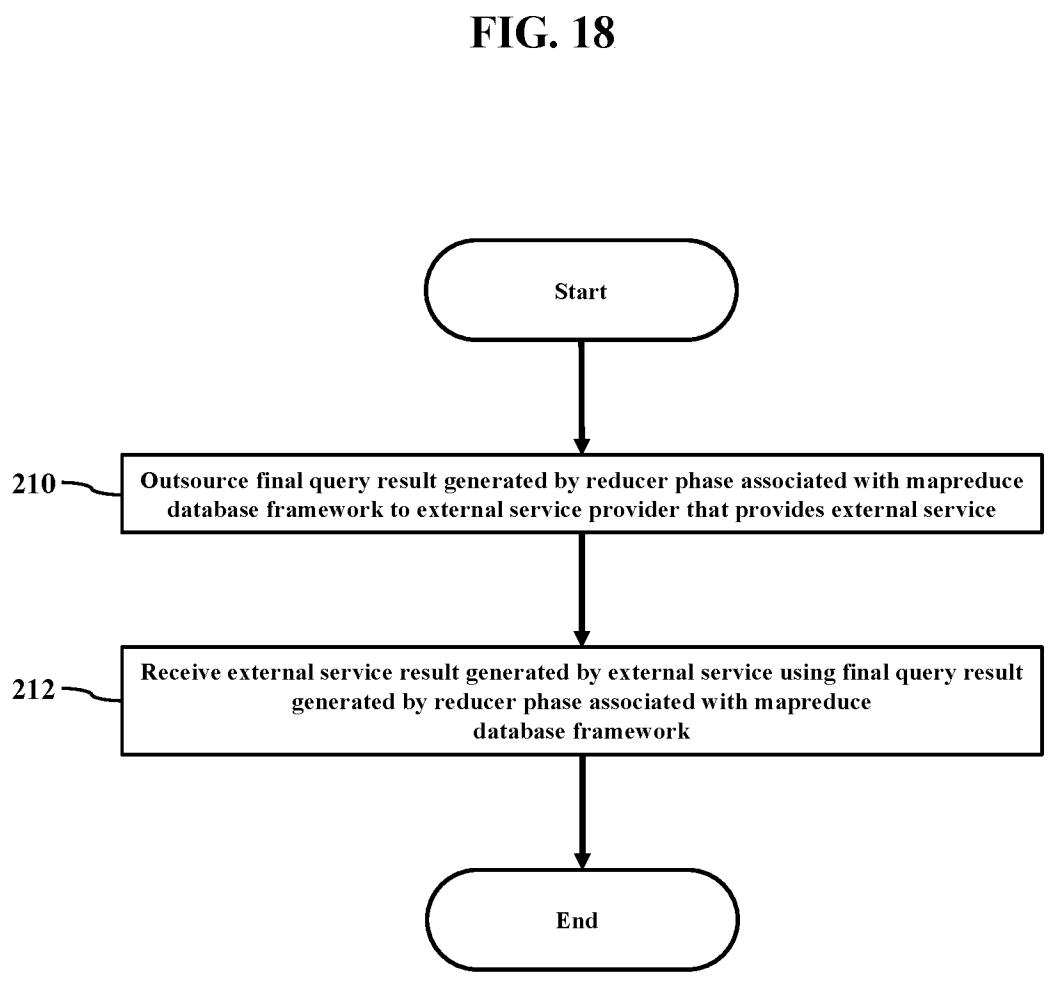

Start

Outsource final query result generated by reducer phase associated with mapreduce database framework to external service provider that provides external service — 210

Receive external service result generated by external service using final query result generated by reducer phase associated with mapreduce database framework — 212

End

FIG. 19

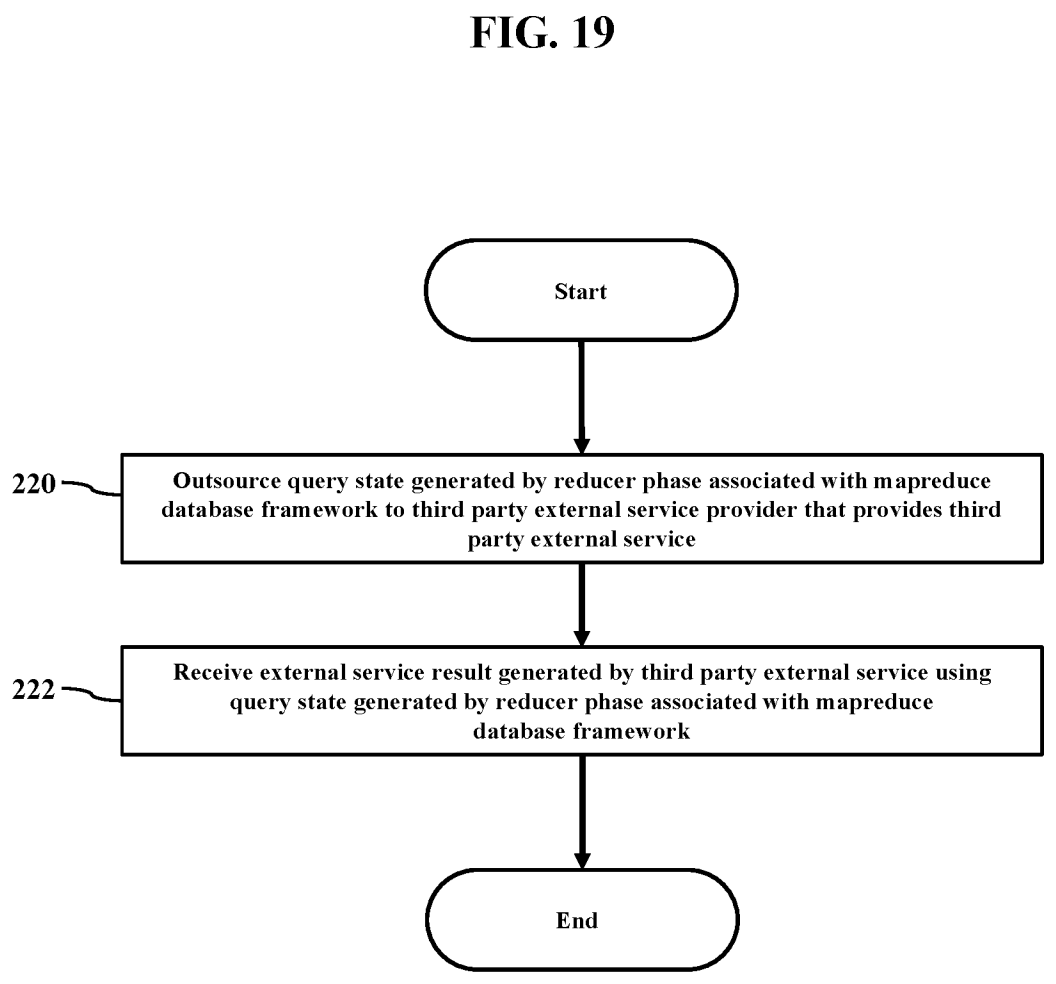

Start

220 — Outsource query state generated by reducer phase associated with mapreduce database framework to third party external service provider that provides third party external service 222 — Receive external service result generated by third party external service using query state generated by reducer phase associated with mapreduce database framework End

EXTERNAL SERVICES IN DISTRIBUTED DATABASES

BACKGROUND

The subject matter described herein generally relates to computers and to computer databases and, more particularly, the subject matter relates to query processing, to distributed database queries, and to mapreduce operations.

Computer databases are used every day. IBM®, APPLE®, AMAZON®, GOOGLE MICROSOFT®, NET-FLIX®, and many others use databases to provide cloud services. Databases have become so large, in fact, that the databases are spread, or distributed, across many different servers. Each server (or node) only stores a portion (or shard) of the entire computer database. When a database must be searched, this sharding technique may produce efficient search results. However, as databases continue to grow in byte size, the sharding technique is not enough. Distributed databases remain limited in their capabilities.

SUMMARY

Computer nodes participate in a distributed database service. The computer nodes store portions, or shards, of a distributed database. The distributed database service polls the computer nodes to map their nodal query states representing their individual shards of the distributed database. Some nodes may then merge, or reduce, the nodal query states to determine a partial, and/or an overall, query state associated with the distributed database. As the nodes provide the distributed database service, some or all of the nodes may interface with one or more external services. The external services provide added features, functions, or enhancements to the distributed database service. The external services may be available to any node of the cluster, or the external services may only be accessible to authorized nodes and/or to particular cluster/service roles. In a mapreduce database framework, for example, the external services may be restricted to reducer/coordinator nodes that merge nodal query states representing individual shards. Whichever nodes are permitted, the nodes may use remote procedure calls to access external services.

BRIEF DESCRIPTION OF THE SEVERAL VIEWS OF THE DRAWINGS

The features, aspects, and advantages of the protective distributed database service are understood when the following Detailed Description is read with reference to the accompanying drawings, wherein:

FIGS. 1-3 illustrate some examples of external services in a distributed database network;

FIGS. 4-5 illustrate examples of multiple external services;

FIG. 6 illustrates examples of a mapreduce database framework;

FIG. 8 illustrates examples of query specification;

FIG. 17 illustrates examples of a method or operations that outsource the external service;

FIG. 18 illustrates more examples of a method or operations that outsource the external service;

FIG. 19 illustrates more examples of a method or operations that outsource the third party external service.

DETAILED DESCRIPTION

Figure 7:
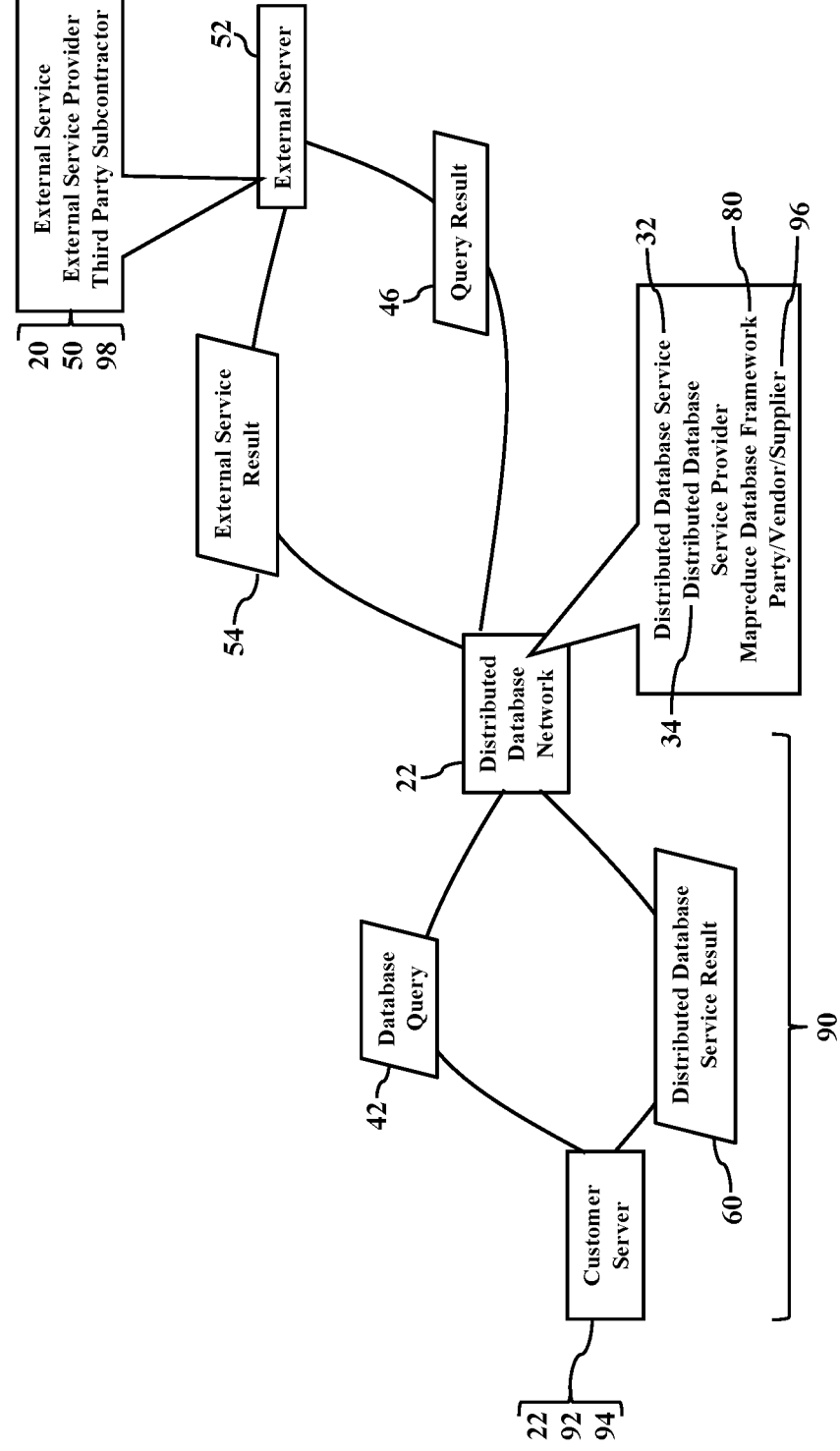
FIG. 7 illustrates examples of party nomenclature.

Distributed databases may be limited in uses. Distributed databases are useful for storing data. Indeed, distributed databases can store and process very large amounts of data. Distributed databases, though, have little or no additional capabilities. A mapreduce database framework, for example, may churn through terabytes of data to produce a search result. The mapreduce database framework, however, does nothing more with the search result. Distributed databases, such as the mapreduce database framework, only search for data and have little or no additional capabilities Some examples of this disclosure relate to external services in distributed databases. Today's databases are very large and might not (or cannot) be stored by a single computer. Many computer databases are thus distributed among different computers, and each computer stores a smaller portion (or shard) of the entire computer database. Conventional distributed databases may thus store much more data, but conventional distributed databases have little or no other capabilities. This disclosure, though, adds a huge variety of external services to a distributed database service. A distributed database service may call an external service to provide additional or supplemental capabilities and functions. The distributed database service generates its search result and merely interfaces with the desired external service. The distributed database service sends the search result to the external service, and the external service acts on the search result and sends an external service result back to the distributed database service. The distributed database service may thus outsource the search result for the external service provided by an external service provider.

Many external services may be available. The distributed database service may interface with many different external services. The distributed database service, for example, may have supplier/vendor/contractor relationships with many external service providers. Indeed, some providers/suppliers/subcontractors may specialize in specific external services. The distributed database service merely interfaces or calls the desired external service, and the distributed database service may then reward or compensate the external service provider (perhaps according to a service agreement). The distributed database service may thus interface with many different external services that provide a great variety of additional capabilities.

The external services in distributed databases will now be described more fully hereinafter with reference to the accompanying drawings. The external services in distributed databases, however, may be embodied and implemented in many different forms and should not be construed as limited to the examples set forth herein. These examples are provided so that this disclosure will be thorough and complete and fully convey the external services to those of ordinary skill in the art. Moreover, all the examples of the external services in distributed databases are intended to encompass both structural and functional equivalents thereof. Additionally, it is intended that such equivalents include both currently known equivalents as well as equivalents developed in the future (i.e., any elements developed that perform the same function, regardless of structure).

Figure 1:
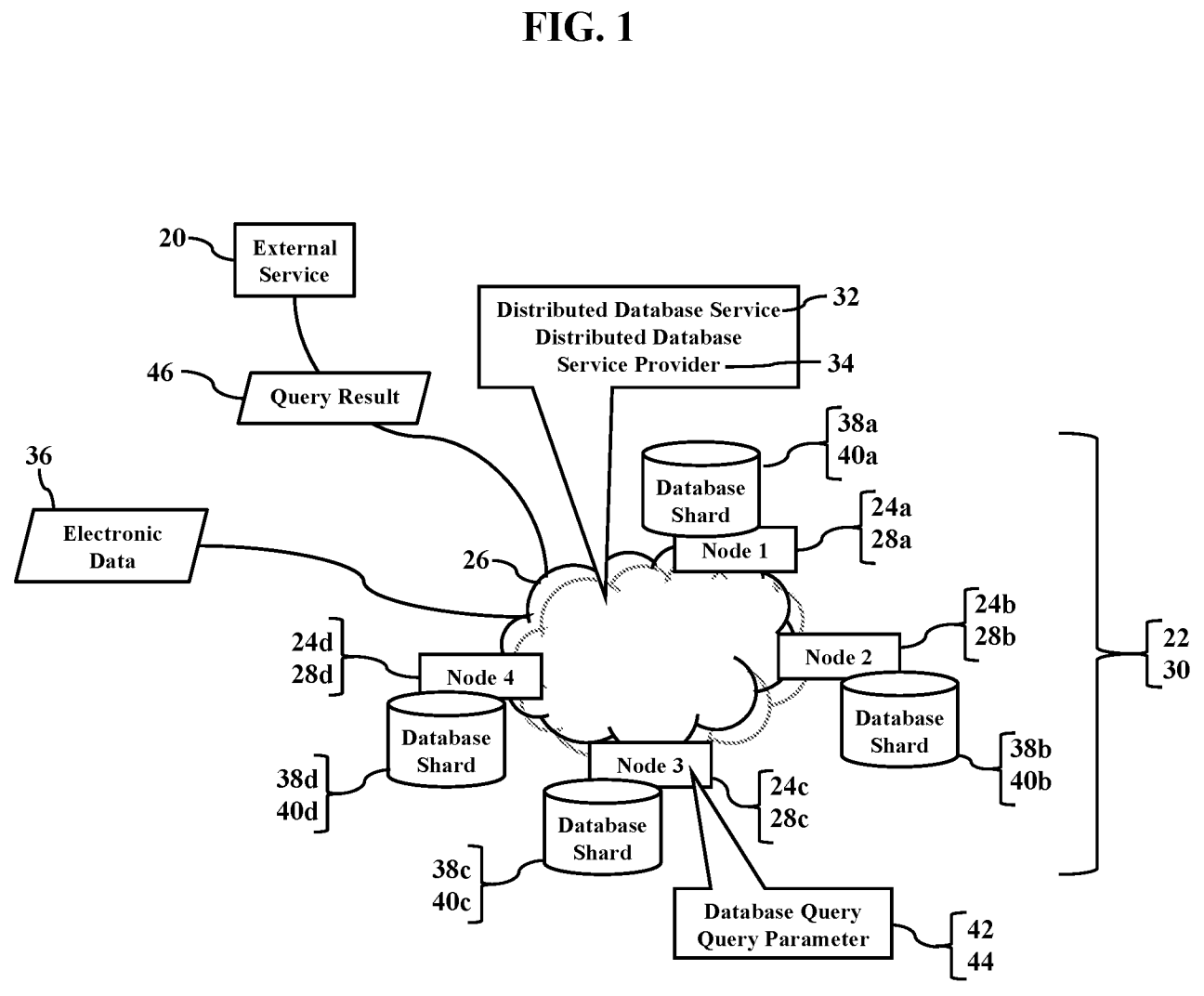
Figure 2:
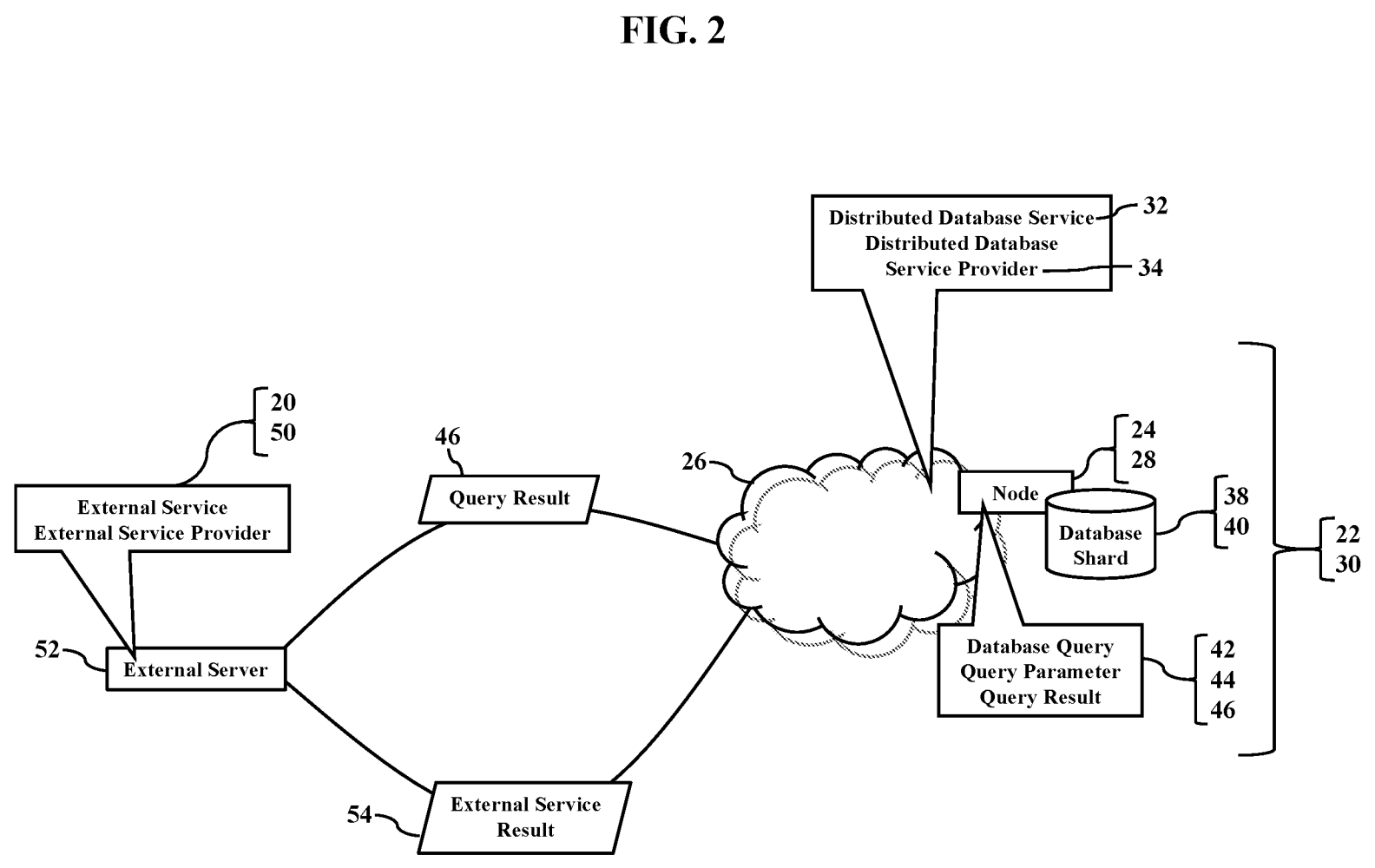
Figure 3:
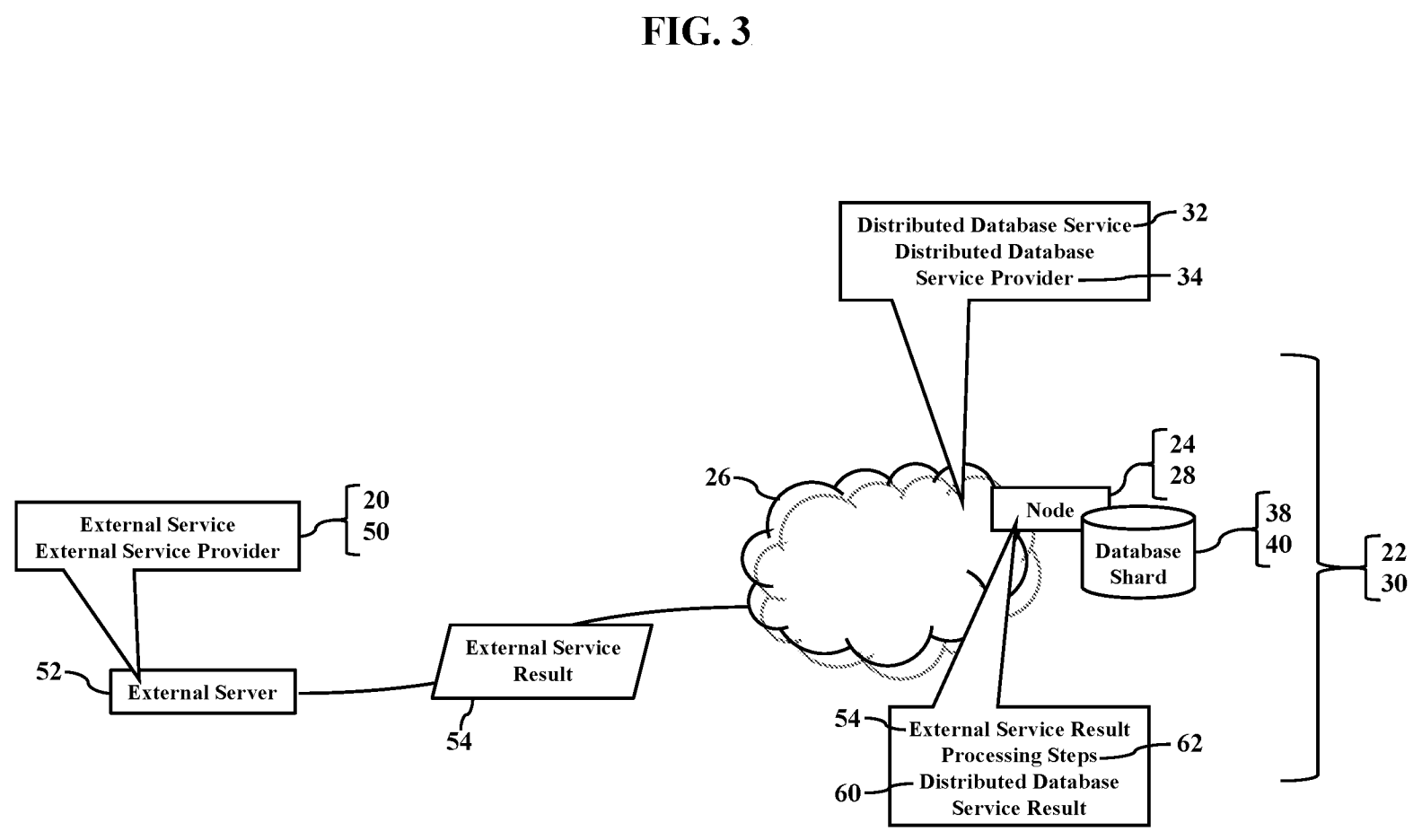

FIGS. 1-3 illustrate some examples of external services 20 in a distributed database network 22. FIG. 1 illustrates the distributed database network 22 as multiple computer systems 24 networked together via a communications network 26. Each computer system 24 may be considered a computer node 28 associated with a computing cluster 30. The computing cluster 30 provides a distributed database service 32 on behalf of a distributed database service provider 34. The distributed database service 32 distributes electronic data 36 among the computer systems 24 associated with the cluster 30. The distributed database service 32, in other words, distributes portions or shards 38 of an electronic distributed database 40 among the computer nodes 28. Any of the computer nodes 28 may thus store its corresponding database shard 38. A manager and/or member of the distributed database network 22 (such as computer node 28c) may receive a database query 42 that specifies one or more query parameters 44. Because the distributed database 40 is distributed among the computer nodes 28, the distributed database network 22 may use a database scheme, technique, or management to generate a query result 46. The distributed database network 22 may then send the query result 46 via the communications network 26 to the external service 20.

The distributed database service 32 is only simply described. The distributed database service 32 distributes the portions or shards 38 of the distributed database 40 among the computer nodes 28. In an actual data center or server farm, for example, the distributed database network 22 may have many different clusters 28, and each cluster 28 may have many (perhaps even hundreds or thousands) of the computer nodes 26 providing the distributed database service 32. Such a large computer cluster 30, though, is too confusing and too difficult to illustrate. FIG. 1, for simplicity then, only illustrates a simple example in which the cluster 30 has four (4) computing systems 24a-d as computer nodes 28a-d. Each computer node 28a-d may thus store its corresponding database shard 38a-d. Each computer system/node 24a-d/28a-d is associated with the cluster 28, but the computer systems 24a-d may have any geographical or logical grouping or organization (such as the aforementioned data center or even a single computer machine).

As FIG. 2 illustrates, the distributed database service 32 may interface with the external service 20. After the distributed database network 22 executes the database query 42, the distributed database network 22 may interface with the external service 20. That is, even though the query result 46 was generated in response to the database query 42, the distributed database service 32 may then order up or request the external service 20 for subsequent processing. The distributed database network 22 sends the query result 46 to a remote network address, IP address, or Internet domain associated with the external service 20 and/or with an external service provider 50 providing the external service 20. FIG. 2, for example, illustrates any of the computer systems/nodes 24/28 locally storing and sending the query result 46 via the communications network 26 to an external server 52 (e.g., outside of, unaffiliated with, or intercluster) that coordinates or provides the external service 20.

The external service provider 50 provides the external service 20. When the external service provider 50 receives the query result 46, the external service provider 50 executes the external service 20 using the query result 46 as a service input. The external service provider 50 generates an external service result 54 as a service output. The external service provider 50 sends the external service result 54 to a network address, IP address, or domain associated with the distributed database service provider 34. FIG. 2, for simplicity, illustrates the external service result 54 sent to, and received by, the computing node 28 associated with the cluster 30.

As FIG. 3 illustrates, the distributed database service 32 may generate a distributed database service result 60. When the distributed database service provider 34 receives the external service result 54 generated by the external service provider 50, the distributed database service 32 may generate the overall or final distributed database service result 60 using the external service result 54 generated by the external service provider 50. The distributed database service 32 may thus provide and/or execute one or more additional or subsequent services or processing steps 62 using the external service result 54 perhaps as an input. While any computer member or members of the cluster 30 may execute the subsequent services or processing steps 62, for simplicity, FIG. 2 illustrates the computing system/node 24/28 generating the distributed database service result 60. However the distributed database service 32 uses, integrates, incorporates, or processes the external service result 54, the distributed database service result 60 reflects some additional contribution or analysis based on the external service result 54 generated by the external service provider 50.

The distributed database service 32 may thus outsource the external service 20 to the external service provider 50. The distributed database service provider 34 may utilize outsourcing and service suppliers to provide the distributed database service 32. The external service provider 50 may be a supplier or contractor that offers the external service 20 to clients, customers, subscribers, or other entities. The distributed database service provider 34 may contract with the external service provider 50 and subcontract or outsource the external service 20. The external service provider 50, though, may be physically external or intercluster to the cluster 30 and logically unaffiliated with the cluster 30. The external service provider 50, in other words, may not be a member nor participant in the distributed database service 32. The external service provider 50 is contractually engaged to create the external service result 54 using the final/reduced query result 46 as a service input. The external service provider 50 may thus fulfill its supplier/subcontractor/outsourcing relationship and service obligation by sending the external service result 54 back to the distributed database service provider 34 in exchange for payment, service, or other form of compensation.

Figure 4:
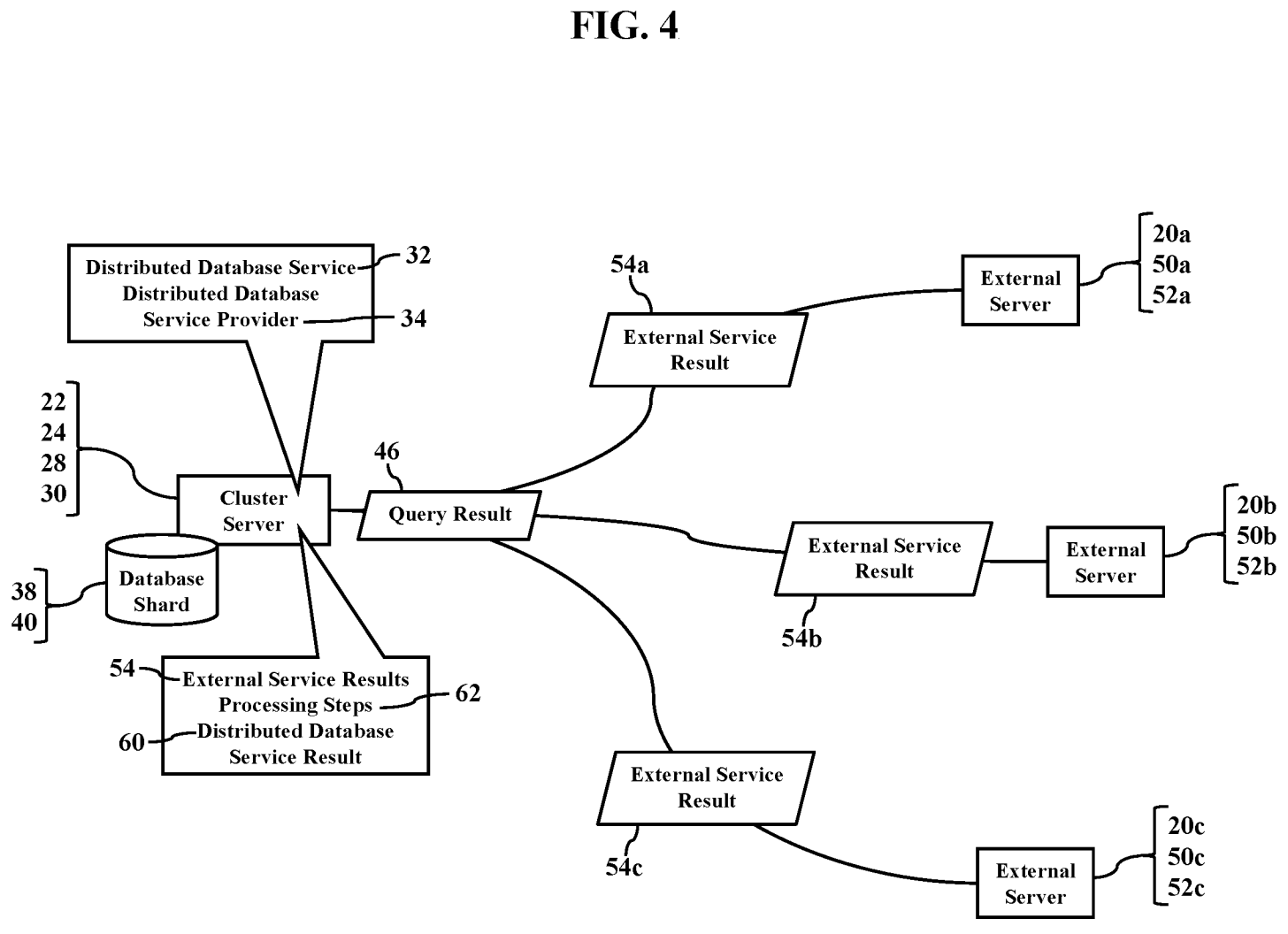
Figure 5:
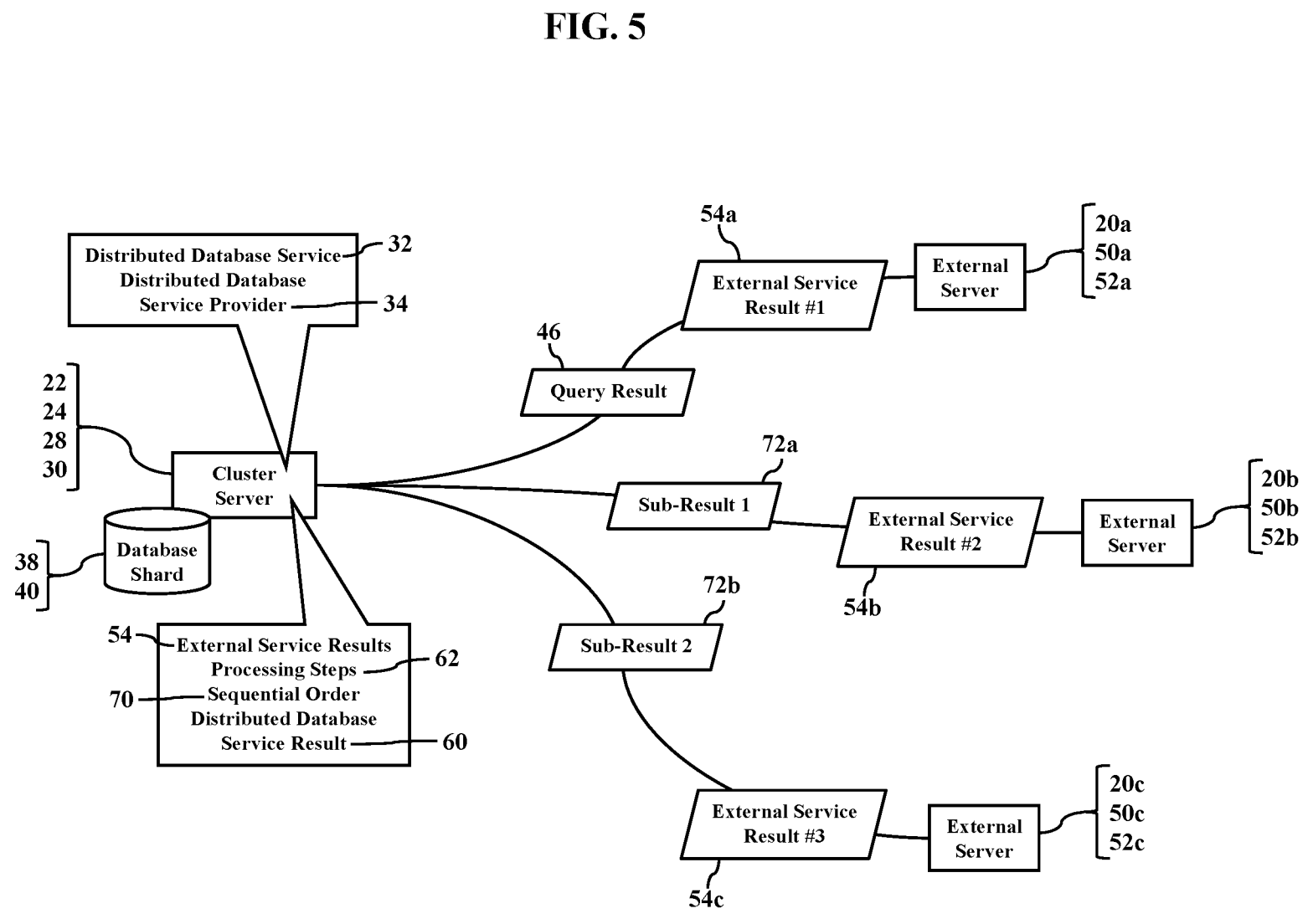

FIGS. 4-5 illustrate examples of multiple external services 20. The distributed database service 32 may interface with multiple external services 20 provided by multiple external service providers 50. FIG. 4, for example, illustrates parallel distribution in which the distributed database network 22 (having the computing system/node 24/28 associated with the cluster 30) outsources the query result 46 to the corresponding address or domain associated with each external service 20 and/or each external service provider 50. While there may be any number of the external services 20, FIG. 4 illustrates a simple example of three (3) external services 20a-c provided by external servers 52a-c and their corresponding external service providers 50a-c. Each external service provider 50a-c generates and sends its corresponding external service result 54a-c. The distributed database service provider 34 collects the individual external service results 54a-c, provides the additional/subsequent processing steps 62 (if any), and generates the overall or final distributed database service result 60.

FIG. 5 illustrates sequential distribution. The distributed database service 32 may require ordered processing of the multiple external services 20 provided by multiple external service providers 50. The distributed database service 32, for example, may implement a sequential order 70 and first send the query result 46 to the first external service 20a specified by the sequential order 70. The first external service 20a generates the first external service result 54a and sends the external service result 54a back to the distributed database service 32. When the distributed database service 32 receives the first external service result 54a, the distributed database service 32 may optionally apply the additional or subsequent services or processing steps 62 using the first external service result 54a as an input to generate a first sub-result 72a. The distributed database service 32 may then send the first sub-result 72a to the second external service 20b specified by the sequential order 70. The second external service 20b generates the second external service result 54b and sends the external service result 54b back to the distributed database service 32. When the distributed database service 32 receives the second external service result 54b, the distributed database service 32 may optionally apply the additional or subsequent services or processing steps 62 using the second external service result 54b as an input to generate a second sub-result 72b. The distributed database service 32 may then send the second sub-result 72b to the third external service 20c specified by the sequential order 70. The third external service 20c generates the third external service result 54c and sends the external service result 54c back to the distributed database service 32. The distributed database service 32 may similarly continue optionally applying the processing steps 62 and sequentially outsourcing the external service results 54 to N external services 20 specified by the sequential order 70, where N is an integer number. Whatever the final external service 20, the distributed database service 32 receives the final external service result 54N. The distributed database service 32 may optionally apply any final services or processing steps 62 using the final external service result 54 as an input to generate the overall or final distributed database service result 60. The distributed database service 32 may thus interface with the external services 20 provided by the external service providers 50.

FIG. 6 illustrates examples of a mapreduce database framework 80. The distributed database service 32 may implement the mapreduce database framework 80 to store and to retrieve large datasets. The computing cluster 30 provides the distributed database service 32, and the computing cluster 30 uses the mapreduce database framework 80 to generate the query result 46 in response to the database query 42. The mapreduce database framework 80 uses mapping functions and reducing functions (hence the term mapreduce) to generate search results in large datasets. A mapper phase 82, for example, may be highly distributive and processes terabytes (TB) of the electronic data 36. A reducer phase 84, though, is centralized and processes/merges much smaller datasets to produce the final/reduced query result 46. The mapreduce database framework 80 is generally used by many big data cloud services (such as AMAZON®, MICROSOFT®, IBM®, and CROWD-STRIKE®), so the mapreduce database framework 80 need not be explained in detail.

The distributed database service 32 may interface with the external service 20. After the mapreduce database framework 80 executes the database query 42 and completes any or all of the mapper phase(s) 82 and the reducer phase(s) 84, the mapreduce database framework 80 generates the query result 46 in response to the database query 42. The distributed database service 32 may then order up the external service 20 for subsequent processing. The distributed database service 32 retrieves the query result 46 generated by the mapreduce database framework 80 and sends the query result 46 to the address/domain associated with the external service 20 and/or the external service provider 50. FIG. 6, for example, illustrates the computer system/node 24/28 (associated with the cluster 30) locally storing and sending the query result 46 via the communications network 26 to the external server 52 that coordinates or provides the external service 20.

The external service provider 50 generates the external service result 54 as a service output. The external service provider 50 sends the external service result 54 to the distributed database service provider 34. FIG. 6, for simplicity, illustrates the external service result 54 sent to, and received by, the computer system/node 24/28 associated with the cluster 30.

The distributed database service 32 may then generate the distributed database service result 60 based on the external service result 54. When the distributed database service provider 34 receives the external service result 54, the distributed database service 32 may generate the overall or final distributed database service result 60 perhaps using the external service result 54, the processing steps 62, and/or the sequential order 70 (as previously explained with reference to FIGS. 4-5).

FIG. 6 again illustrates a simple example. In an actual data center or server farm, the mapreduce database framework 80 may have hundreds or even thousands of the computer systems/nodes 24/28 providing the mapper phase(s) 82 and the reducer phase(s) 84. Such a large cluster 30 and/or mapreduce database framework 80, though, is again too difficult to illustrate. For simplicity, then, FIG. 6 only illustrates the single computer system/node 24/28. Whatever the number of the computer systems/nodes 24/28, the computer systems/nodes 24/28 may have any geographical or logical grouping or organization (such as the aforementioned data center or even a single computer machine).

The distributed database service 32 may utilize supplier relationships. The distributed database service provider 34 may utilize outsourcing and service suppliers to provide the distributed database service 32. The external service provider 50 may be a supplier or contractor that offers the external service 20 to clients, customers, subscribers, or other entities. The distributed database service provider 34 may thus contract with the external service provider 50 and subcontract or outsource the external service 20. The external service provider 50 creates the external service result 54 using the final/reduced query result 46 as a service input. The external service provider 50 may thus fulfill its supplier/subcontractor/outsourcing relationship and service obligation by sending the external service result 54 back to the distributed database service provider 34 in exchange for payment, service, or other form of compensation.

The distributed database service 32, for example, may utilize vertical integration. The external service provider 50 may be vertically integrated within, and/or affiliated with, the distributed database service provider 34, perhaps even under the same company/corporate umbrella. The external service provider 50 and the distributed database service provider 34 may thus share the same top-level networking domain (e.g., www.company.com/address1 and www.company.com/address2). The computing cluster 30, providing the distributed database service 32, may thus insource the final/reduced query result 46 within the www.company.com domain to the external service provider 50 for execution of the external service 20. The external service provider 50 may thus be an in-house or intradomain supplier that generates the external service result 54.

The distributed database service 32 may utilize cluster outsourcing. The external service provider 50 may be external to, and/or unaffiliated with, the distributed database service provider 34. The external service provider 50 and the distributed database service provider 34 may thus have different and unrelated top-level networking domains (e.g., www.company.com and www.supplier.com). The computing cluster 30, providing the distributed database service 32, may thus outsource the final/reduced query result 46 from the www.company.com domain via the communications network 26 to the www.supplier.com domain for execution of the external service 20. The external service provider 50 may thus be an interdomain or intercluster 30 supplier that generates the external service result 54.

Figure 9:
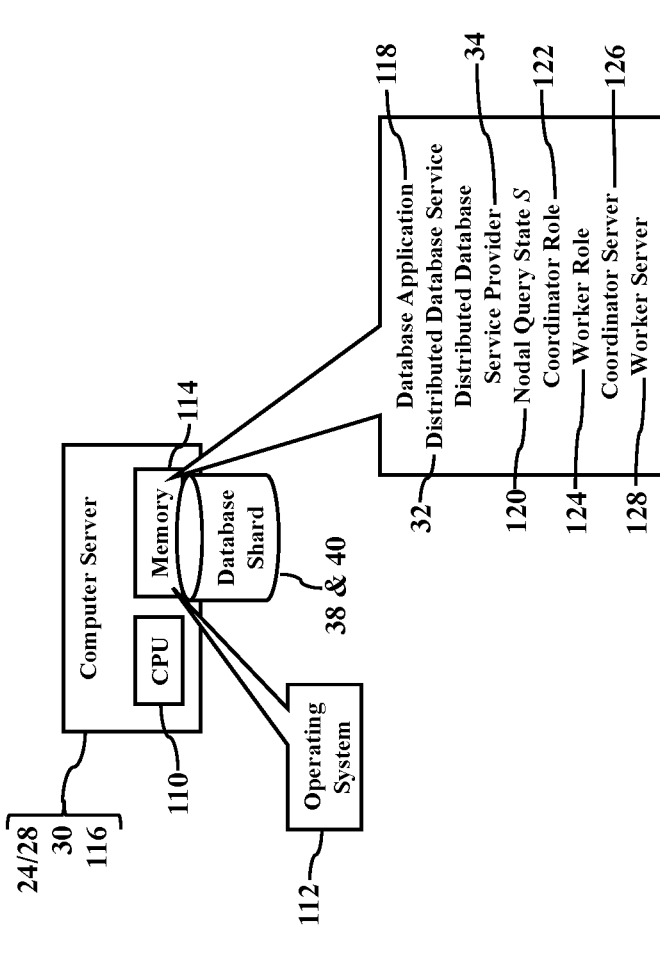
FIGS. 9-11 illustrate more examples of external servicing in a distributed database network.

FIG. 7 illustrates examples of party nomenclature. The distributed database service provider 34 may have many customer/supplier relationships when providing the distributed database service 32. FIG. 9, for example, illustrates a customer relationship 90. The database query 42 originates from a customer's computer system 24 (illustrated as a customer server 92). A customer or client (e.g., a first or customer party 94) of the distributed database service 32, for example, issues the database query 42. The distributed database service provider 34 (e.g., a second party or vendor/supplier 96) executes the database query 42 (perhaps using the mapreduce database framework 80) and generates the final/reduced query result 46. The distributed database service provider 34 outsources the query result 46 to the external service 20. The external service provider 50 (e.g., a third party and/or subcontractor 98) generates the external service result 54 using the query result 46. The distributed database service provider 34 receives the external service result 54 and generates the distributed database service result 60. The distributed database service provider 34 may thus insource or outsource the external service 20 to the third party external service provider 50. The distributed database service provider 34 may then generate and send the distributed database service result 60 to the customer/client server 92.

FIG. 8 illustrates examples of query specification. When the distributed database service 32 receives the database query 42 (from a customer/party/source), the database query 42 specifies the query parameter(s) 44. The database query 42, though, may also specify the external service provider 50 that provides the external service 20. The database query 42, for example, may be packetized data having a header and/or a payload that identifies an IP address, web domain, URL, or other external service identifier 100 associated with the external service 20. When the distributed database service 32 receives the database query 42, any cluster member (such as computer system/node 24/28 illustrated in FIGS. 1-7) may inspect the packet, identify the appropriate data field, and read the external service identifier 100. Once the distributed database service 32 determines the external service 20 and/or the external service provider 50, the distributed database service 32 may then route or direct the final/reduced query result 46 to the external service network destination. The database query 42, however, may use other schemes or mechanisms to indicate the external service 20.

Figure 10:
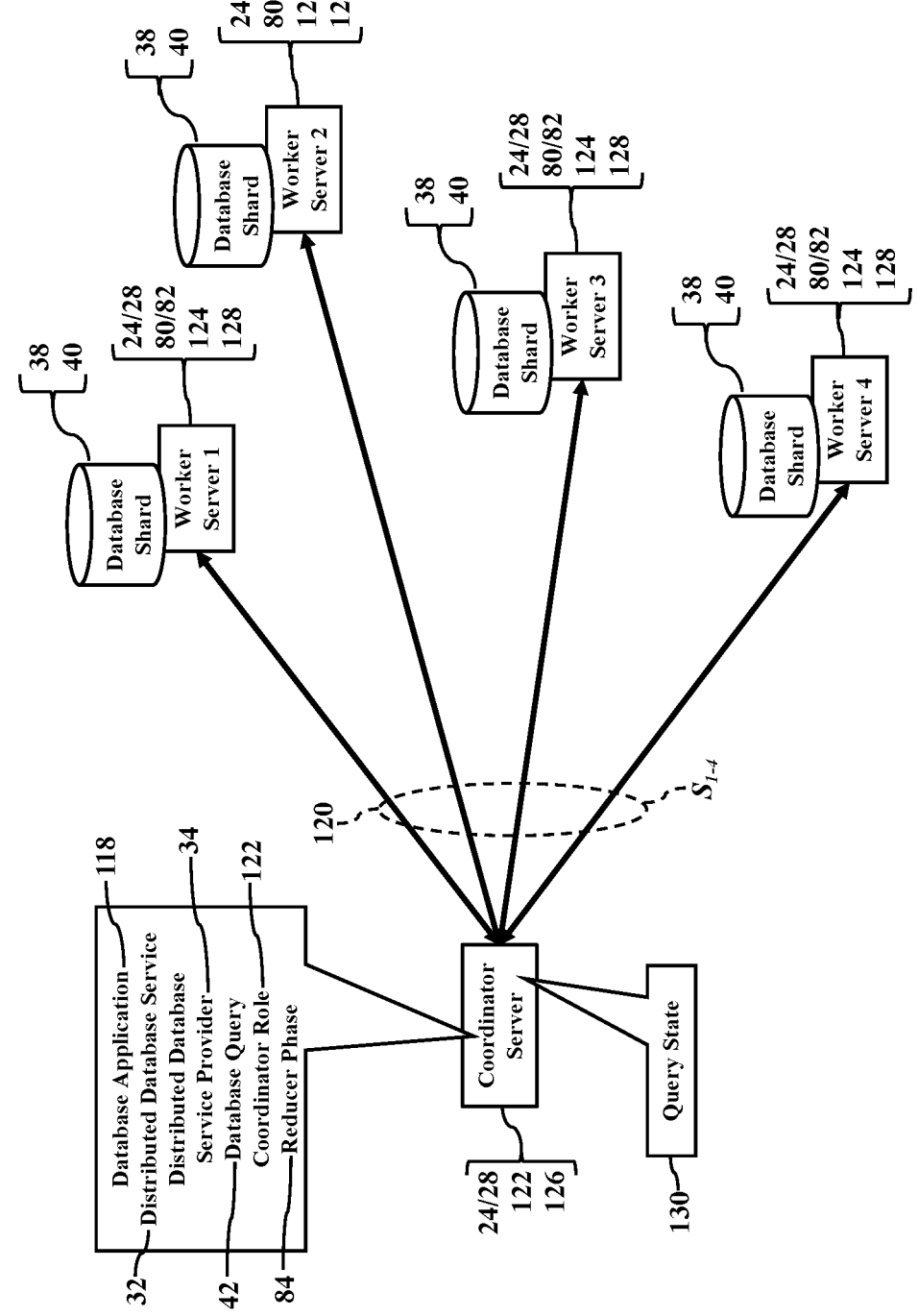
Figure 11:
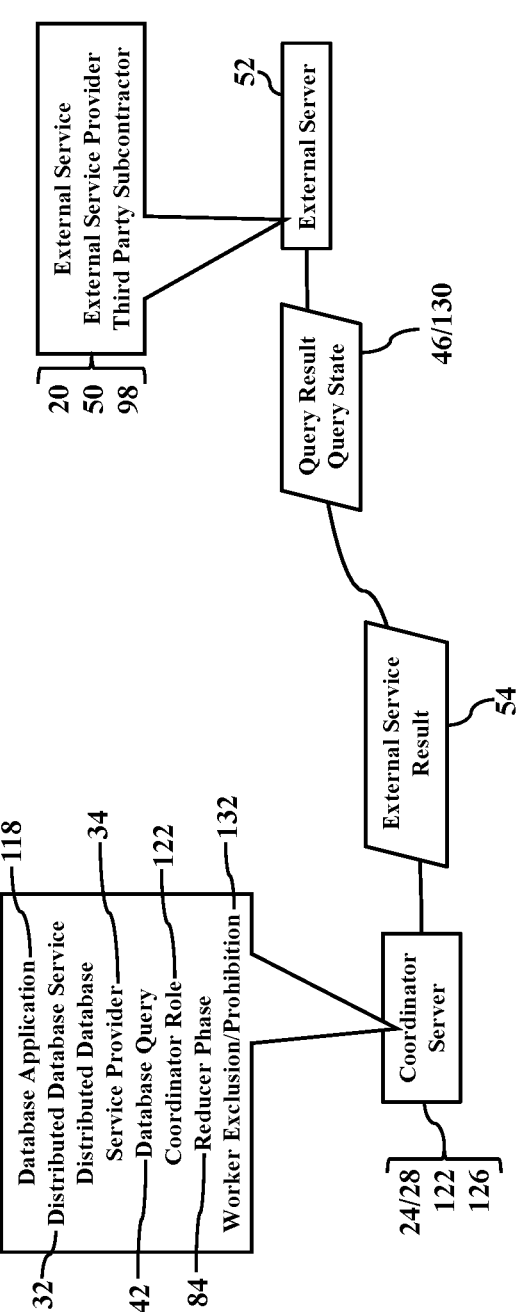

FIGS. 9-11 illustrate more examples of external servicing in the distributed database network 22. The computer system 24 (associated with the cluster 30) provides at least a portion of the distributed database service 32. The computer system 24 has a hardware processor (illustrated as CPU) 110 that executes an operating system 112 stored in a memory device 114. FIG. 9 illustrates the computer system 24 as a server 116, but the computer system 24 may be any processor-controlled device (as later paragraphs will explain). The server 116 also stores a database application 118 in the memory device 114. The database application 118 may thus be a software engine (such as computer program, code, or instructions) that instructs or causes the server 116 to perform operations, such as querying the database/shard 40/38 (perhaps according to the database query 42, as earlier explained). The database application 118 may further include code or instructions that instruct or cause the server 116 to generate its individual query result (such as its corresponding nodal query state 120).

The distributed database service 32 may further include role play. The distributed database service 32 may implement roles or responsibilities. The distributed database service 32, for example, may assign a coordinator role 122 and/or a worker role 124. The coordinator role 122 manages or administers the distributed database service 32, and the worker role 124 performs data storage/retrieval work. Any of the computer systems/nodes 24/28 may have the coordinator role 122, and any of the computer systems/nodes 24/28 may have the worker role 124. Indeed, any computer system/node 24/28 may dynamically switch from, between, and/or to the coordinator role 122 and the worker role 124. The database application 118 may thus further include code or instructions that instruct or cause the server 116 to function or perform according to the coordinator role 122 and/or to the worker role 124. The computer system 24 may thus be indicated as a coordinator server 126 or as a worker server 128, depending on the dynamically-assigned coordinator role 122 or the worker role 124.

FIG. 10 illustrates mapreduce operations. The distributed database service 32 may query the worker servers 128. Each worker server 128 stores its corresponding portion or shard 38 of the distributed database 40. When the distributed database service 32 needs access to the entire distributed database 40, the protective distributed database service 32 may query the worker servers 128. The distributed database service 32 queries the worker servers 128 in response to the database query 42. FIG. 10, for example, illustrates the coordinator server 126 receiving and storing the database query 42. The coordinator server 126 may thus act as a query handler and query the worker servers 128 according to the database query 42. The coordinator server 126 may then collect, reduce, aggregate, and/or merge query responses from the worker servers 128. The worker role 124 performs or carries out other query processing tasks, such as querying its database shard 38 (perhaps according to the database query 42) and retrieving/mapping its corresponding nodal query S (illustrated as reference numeral 120). The coordinator role 122 and the worker role 124, though, may dynamically vary, change, or switch according to a performance or administrative criterion.

The coordinator server 126 generates the query result 46. The coordinator server 126 (assigned the coordinator role 122) queries each worker server 128. Each worker server 128 queries its corresponding database shard 38 and identifies its corresponding partial or nodal query state S (illustrated as reference numeral 120). Each worker server 128 may thus perform the mapper phase 82 associated with the mapreduce database framework 80. Each worker server 128 sends its corresponding nodal query state 120 to the coordinator server 126. The coordinator server 126 may then execute additional mapreduce operations (such as the reducer phase 84) that merge, join, aggregate, or otherwise reduce the nodal query states 120 (sent by the worker servers 128) to generate the overall or cumulative query result or query state 130 (such as the final/reduced query result 46).

The coordinator server 126, in general, may merge (e.g., $S_1+S_2+S_3+S_4$) to equal the full query state 130.

As FIG. 11 illustrates, the coordinator server 126 may then request the external service 20. Once the coordinator server 126 (performing the coordinator role 122) completes any one or more reducer phases 84, the database application 118 may further instruct or cause the coordinator server 126 to establish communication with the external service 20 and send the final query state 130 (e.g., the final/reduced query result 46) to the external service 20. Indeed, the database application 118 may be configured to only permit or allow the coordinator role 122 to request the external service 20. Worker roles 124 performed by worker servers 128 (illustrated in FIGS. 9-10) may thus be prohibited from requesting an external service 20. This worker exclusion or prohibition 132 prevents a worker server 128 from prematurely requesting the external service 20 before the coordinator role 122 generates any intermediate or the final query state 130 (e.g., the final/reduced query result 46). The worker exclusion or prohibition 132 may further prevent the worker role/server 124/128 from receiving the external service result 54 generated by the external service 20. Simply put, the database application 118 may only authorize the coordinator roles/servers 122/126 interfacing privileges with the external service 20.

Computer functioning is greatly improved. As the mapreduce database framework 80 executes a query (such as the database query 42), the mapreduce database framework 80 may split the cluster work onto the multiple different nodes 28. The worker nodes/servers 28/128 (assigned the worker role 124 during the mapper phase 82) execute the brunt of the query execution. The worker nodes/servers 28/128, for example, find the search results that correspond to the database query 42 and pass those search results on in the pipeline. However, one or more of the worker nodes/servers 28/128 may also be designated as the coordinator role 122 and execute the mapper phase 84. The coordinator role 122 gets an added responsibility of managing the entire query execution. The coordinator role 122 communicates with the other worker nodes/servers 28/128 for their individual or local nodal query state S (illustrated as reference numeral 120) (such as the files they perhaps searched through, the log lines they searched through, or other database search results). The coordinator role 122 will then pull the workers' coordinator role 122 onto itself, and it will begin merging the nodal query states 120 from all the different worker nodes/servers 28/128, in order to create the one final, combined query result 46 (such as the total query state 130). In terms of the distributed database service 32, and/or in terms of the external services 20, the query result 46 (such as the total query state 130) means that the full search result is available, or at least for queries that do not hit a limit otherwise will have the full result on the coordinating node. Far less networking issues arise by calling the external service 20 on the coordinating node 28 rather than at the worker nodes 28. Again, in big data systems, the worker nodes 28 may process data at the petabyte ($2^{50}$) scale. These huge amounts of data, if sent unfiltered from worker nodes/servers 28/128 to an external service 20, would likely bombard the external service 20 into capitulation. Few networks and external services 20 could manage this much data. Moreover, even if this much data could be handled, the costs in a virtual or actual currency would be very, very expensive.

Still more computer functioning is improved. Big data queries may also be detrimental to the distributed database service 32. The worker nodes/servers 28/128 perform the brute force database search. If the worker nodes/servers 28/128 had to wait for a network call, then the worker nodes/servers 28/128 cannot efficiently search. The worker nodes/servers 28/128, for example, may scan through millions of hardware/software events per second for the database query 42. Calls to the external service 20 would effectively mean no performance query at all. Network calls are typically slow, perhaps orders of magnitude slower than doing work locally. So, limiting the external service 20 to the coordinating node 28 means that the worker nodes/servers 28/128 keep working and mapping search results with minimal or no delay. The worker nodes/servers 28/128 send their updated search results whenever the coordinating node 28 asks for them. The coordinating node 28 (assigned the coordinator role 122) merges and reduced the nodal query states 120 and sends the final query result 46 (such as the total query state 130) to the external service 20.

Figure 12:
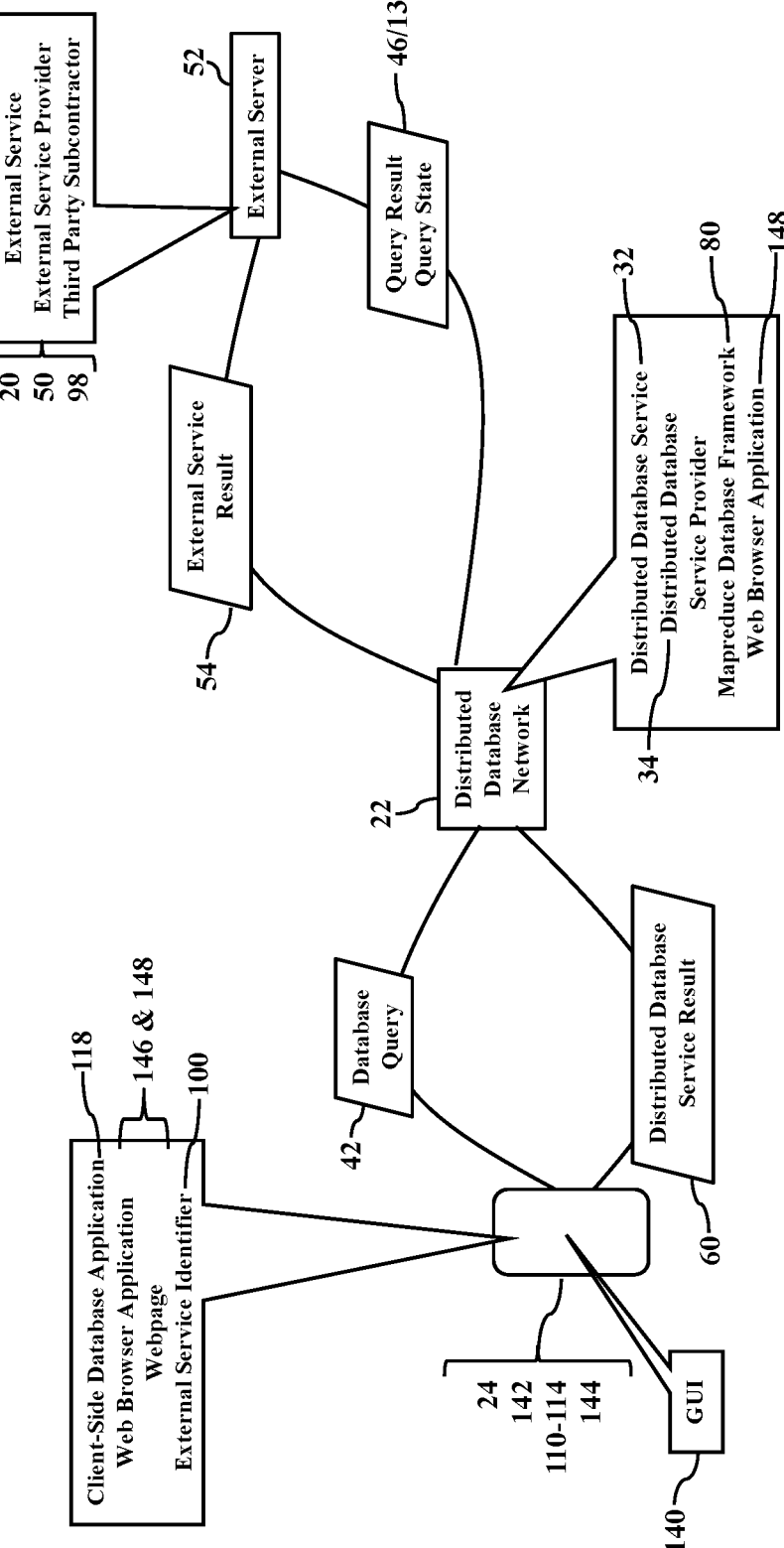
FIG. 12 illustrates examples of a graphical user interface (or GUI)
Figure 13:
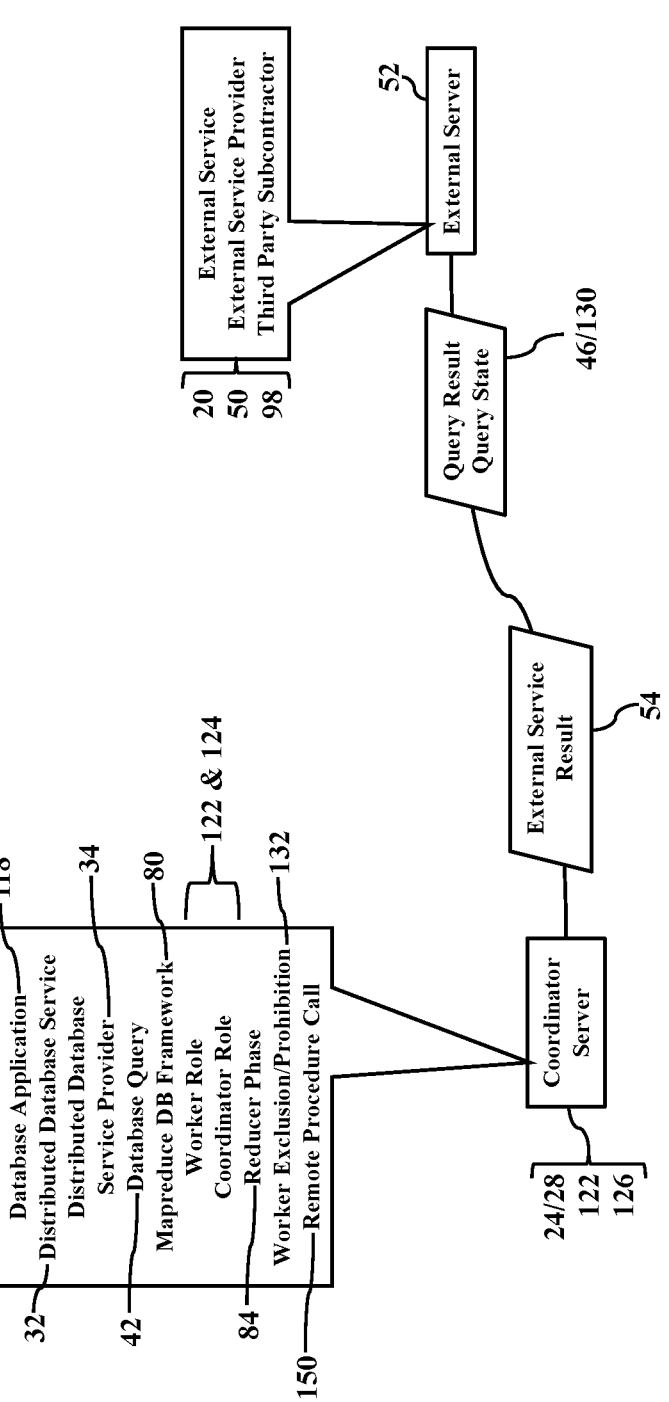
FIGS. 13-16 illustrate examples of remote procedure calls in the distributed database network.

FIG. 12 illustrates examples of a graphical user interface (or GUI) 140. This disclosure previously explained how the distributed database service 30 may interface with the customer's computer system 24. Any customer may thus use any computer system 24 to search the distributed database 40 for any customer-specified database queries 42. FIG. 12, for example, illustrates the customer's computer system 24 as a mobile smartphone 142. The smartphone 142 has the hardware processor 110 that executes the operating system 112 stored in the memory device 114. The hardware processor 110 also executes a client-side version of the database application 118 stored in the memory device 114. The client-side version of the database application 118 cooperates with the server/service-side database application 118, perhaps in a client/server relationship, to obtain the distributed database service 32. The client-side version of the database application 118, for example, instructs or causes the smartphone 142 to generate and display the GUI 140 via a display device 144. The GUI 140, as a simple example, may be generated as a webpage 146 by a web browser application 148. The GUI 140 may have data fields for inputting the query parameters 44. A user of the smartphone 142 may thus tactilely or capacitively enter the desired query parameter(s) 44. The user of the smartphone 142 may also tactilely or capacitively enter the desired external service 20 to be applied to the search results. That is, the GUI 140 (and/or the webpage 146) may have additional data fields for inputting the IP address, web domain, URL, or other external service identifier 100 associated with the external service 20. The client-side version of database application 118 interfaces with the distributed database service 32 (perhaps using the web browser application 148) to generate and send the database query 42 to the distributed database network/system 24/32. When the distributed database service 32 receives the database query 42, the distributed database network/service 22/32 generates the query result 46 (perhaps using the mapreduce database framework 80). The distributed database network/service 22/32 insources/outsources the query result 46 to the external service 20, and the distributed database network/service 22/32 receives the external service result 54. The distributed database network/service 22/32 may then send the distributed database service result 60 back to the smartphone 142, perhaps as data representing another or updated webpage 146. The distributed database service result 60 thus represents the external service 20 applied to the query result 46.

FIGS. 13-16 illustrate examples of remote procedure calls 150 in the distributed database network 22. The database application 118 allows a user of the distributed database service 32 to configure and setup one or more remote procedure calls (or "RPC") 150 (perhaps using HTTP) to the external service 20. The remote procedure call 150 may define or specify functions on computers external to, outside of, or intercluster, the cluster 30 providing the distributed database service 32. The external computers, in other words, perform or execute the actual computation on the query result/state 46/130 and send the external service result 54 back to the distributed database service 32 (such as the coordinator server 126 assigned the coordinator role 122) for further processing or presentation.

The remote procedure calls 150 may be based on the role play. Any worker role 124 and any coordinator role 122 may utilize remote procedure calls 150 to invoke the external service 20. However, remote procedure calls 150 by worker servers 128 may present challenges. As there may be hundreds or more of the worker servers 128 at any time (especially in the mapreduce database framework 80, as explained with reference to FIG. 10), the number/volume of remote procedure calls 150 may be very large and can concurrently run, thus possibly overwhelming networks and disrupting or denying the external service 20. The distributed database service 32, the database application 118, and/or the mapreduce database framework 80 may thus only permit the remote procedure call 150 to run on the query coordinating node 28 (e.g., the coordinator role 122 performed by the coordinator server 126). As the mapreduce database framework 80 may have much less coordinator servers 126 (indeed, perhaps only a single coordinator node 28), the database application 118 may only permit the coordinator role/server 122/126 to make the remote procedure call(s) per database query 42.

Figure 14:
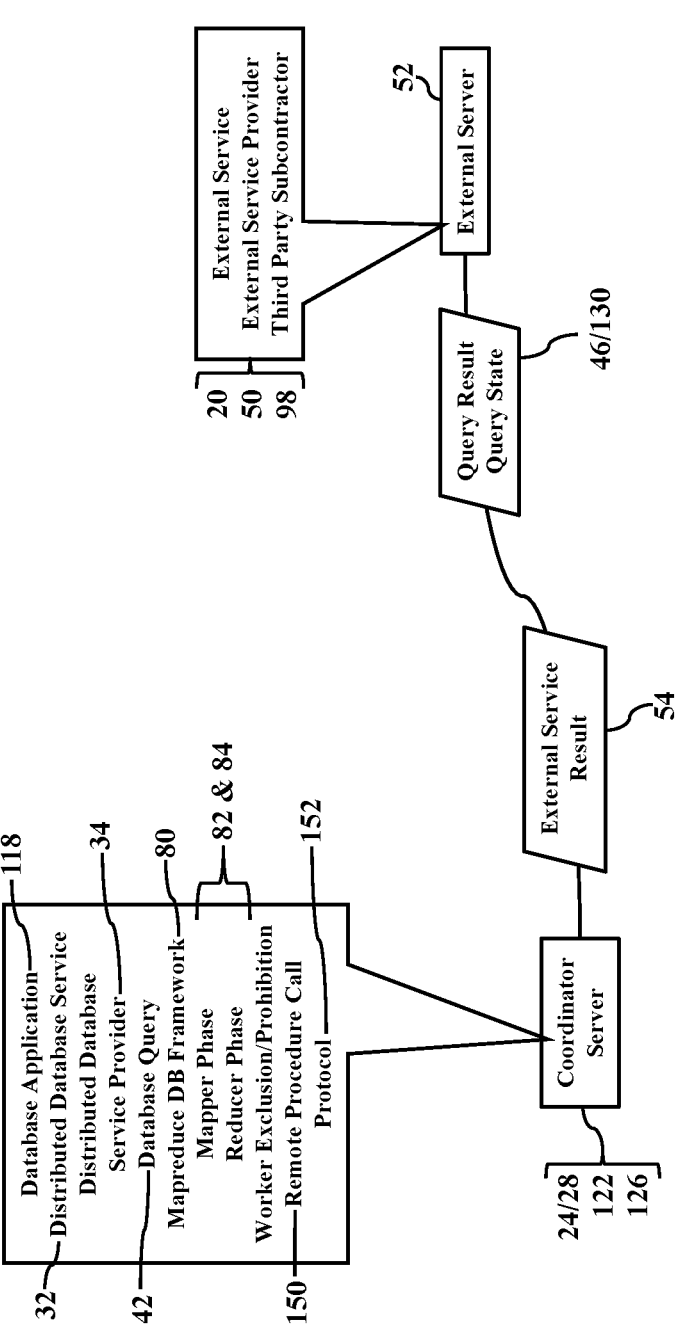

As FIG. 14 illustrates, the remote procedure call 150 may use any protocol 152. Whatever the protocol 152, the protocol 152 may define or specify the external service 20 (such as a web service) in terms of endpoints and/or data formats. The distributed database service 32 may thus use the protocol 152 to communicate with the external service 20 implementing a set of external functions. The distributed database service 32, for example, may utilize the mapreduce database framework 80 that splits the database query 42 into the mapper phase 82 and the reducer phase 84. The mapper phase 82 is highly distributed and may process TBs of the electronic data 36, while the reducer phase 84 is done centrally and processes much reduced data sets (e.g., such as thousands of rows in the database 40). Multiple, different external services 20 may be called, and the final/reduced query result 46 (such as the query state 130 of the database 40) may be calculated/merged/generated/determined after all the external service results 54 are received and/or sequentially processed (as explained with reference to FIGS. 4-6).

Figure 15:
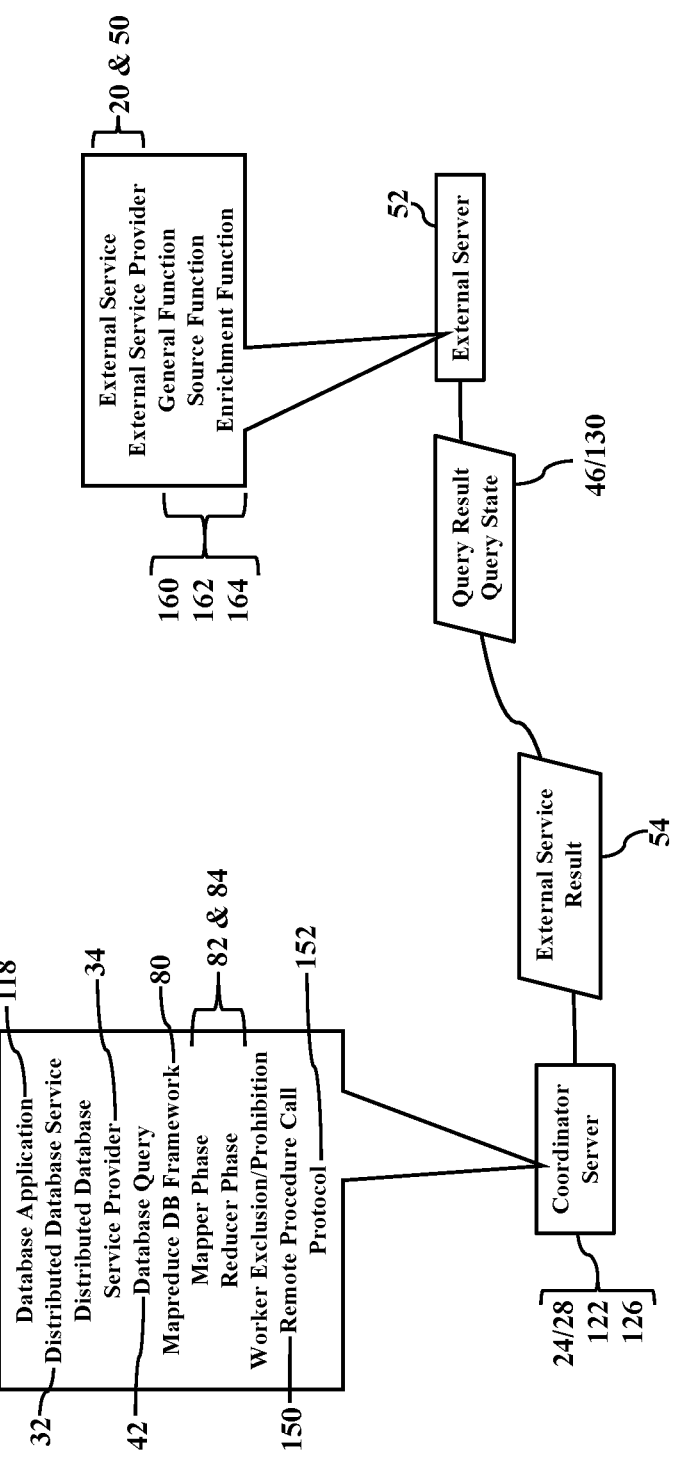

As FIG. 15 illustrates, the distributed database service 32 may interface with any external service 20. The inventors envision that service providers/suppliers/subcontractors will develop many different external services 20 to provide many different external functions. Indeed, some providers/suppliers/subcontractors may specialize in specific external services 20. In general, though, the external services 20 may be categorized or labeled as general functions 160, source functions 162, and/or enrichment functions 164. These functions 160-164 may share the same protocol 152. Any database query 42 associated with the external service 20 having the general function 160, for example, may collect all data from the mapper phase 82 and then do one batch call to the web service or other external service 20. The distributed database service 32 may then wait for the external service result/response 54 and, then, continue executing the reducer phase 84 based solely on the external service result/response 54. Any database query 42 associated with the source function 162 may similarly behave as the general function 160, perhaps however, that no search results may be sent to the external service 20. Upon receiving the external service result/response 54 from the external service 20, the distributed database service 32 may continue executing the reducer phase 84 based solely on data or information referenced or included with the external service result/response 54. Any database query 42 associated with the enrichment function 164 may be used to enrich search results with added metadata. That is, the purpose of the enrichment function 164 may be to enrich the final/reduced query result/state 46/130 with additional data fields from the external service 20. For example, a search result containing an IP address field may be enriched, using the external service 20, with a DNS name field. The key fields used for enrichment may be defined in the RPC protocol 152 and/or the corresponding RPC function. Furthermore, the distributed database service 32 may only send the key fields to the external service 20. The distributed database service 32, in other words, may define or specify only certain search results, data fields, or other information is permissible or authorized for the external functions 160, 162, and/or 164. Any service request to the external service 20 may thus be required to specify correct service parameters, and the external service result 54 may be required to contain or reference the same search results or data fields. The enrichment function 164, however, may be permitted to annotate or generate additional fields that enrich the source data. Whatever the added/new/enriched data fields, any added data fields may be added prior to the reducer phase 84.

The enrichment function 164 may be commonly called. The queries for the general function 160 may merely be any classification of any search results. However, the general function 160 may require sending all the search results (e.g., the final query result 46 and/or the query state 130). The external service 20, though, is known or identified as the enrichment function 164, may only require sending a portion or partial search results. Only specific database fields or values, for example, need be enriched, so only those specific database fields or values need be sent to the external service 20. The distributed database service 32 and the external service 20 may thus establish service configurations that identify the search results to be sent. The distributed database service 32 may thus only send those specific search results to further reduce hardware/software resources and networking demands. The enrichment function 164, for example, may have some key that defines a relationship with other data, and so the distributed database service 32 may thus only send the key (instead of sending the full search results/events/fields). The coordinator node 28 may thus locally store the final query result 46 and/or the full query state 130, and the coordinator node 28 may receive the enriched, external search result 54 back from the external service 20. The coordinator node 28 may then merge or join the enrichment to the final query result 46 and/or the full query state 130, thus creating a new, and larger result.

The source function 162 may be efficient. The source function 162 may not depend on the search results (e.g., the final query result 46 and/or the query state 130). In fact, the source function 162 may typically ignore the search results, even if sent. That is, the source function 162 may be oblivious or uncaring to the search results. The source function 162 may merely create or fetch additional data and send that additional data back to the distributed database service 32. The source function 162 may thus disregard any search results available from the distributed database service 32. The distributed database service 32 may thus query the external service 20 for the additional or supplemental data sourced from the external service 20, and then the distributed database service 32 may use the additional data to further a search in some way. The coordinator node 28 may thus merge/reduce and then perform a search filtering operation to only send some, or none, of the search results to the external service 20.

Figure 16:
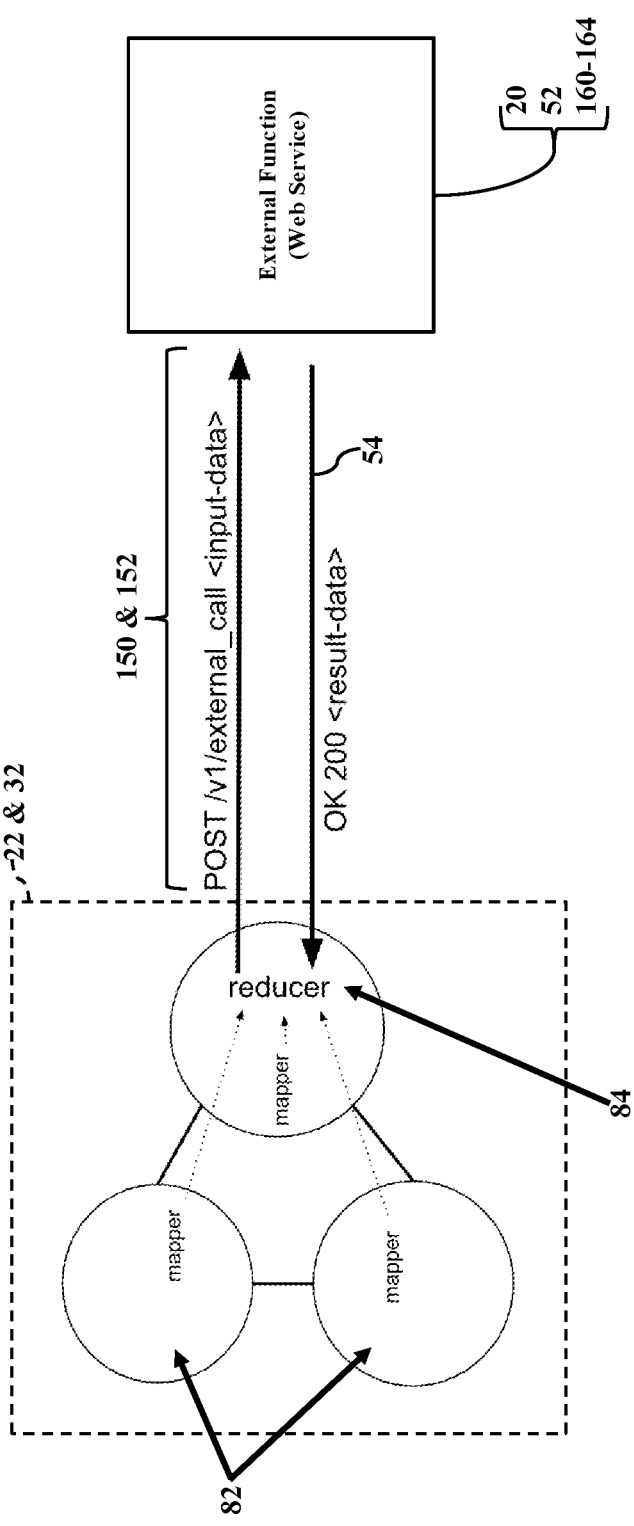

FIG. 16 further illustrates the protocol 152 for the remote procedure call 150. The distributed database service 32 may be configured with a uniform resource locator (or URL) associated with the external service 20 (such as a web service https://<host>/<rootpath:optional>). The distributed database service 32 may be configured to assume the external service 20 is valid and exists (e.g., the/v1/external_call endpoint exists at the root path), so the distributed database service 32 may use the URL for calling the external function(s) 160-164. While any request/response/authentication scheme or mechanism may be used, the HTTP basic access authentication transactional method may be used to authenticate the distributed database service 32 to the external service 20. The coordinator server 122/126, for example, may store and execute the web browser application 148 (as FIG. 12 illustrates) that authenticates (e.g., such as a username/password/credentials and/or authentication header) as a service client to the external server 52 associated with the external service 20. The database application 118 and/or the distributed database service 32 may have a configuration setting specifying a timeout parameter. If, for example, the external service 20 fails to respond within the timeout parameter (such as 30 seconds), the computer system 24 may assume the request timed out and fail the query. Again, while any request/response/authentication scheme or mechanism may be used, the external service 20 may use OK 200 for both successful response and when encountering function level errors (such as parameter validation errors). Any HTTP status code other than OK 200, in other words, may be considered a fail on the external server 52 and may result in the query being stopped with a fail. Other HTTP status codes, though, may be used for HTTP layer errors and not for the external service 20 (or functions 160-164) itself. Indeed, any error messages returned from the external service 20 may be propagated to end-user devices (such as the smartphone 142 illustrated in FIG. 12) interfacing with the distributed database service 32. A successful response may set an optional warnings field with a list of warning texts for the end-users. This can be used for situations where the result is partial, such as some input events having the wrong format.

Data may be transferred from the distributed database service 32 to the external service 20. While any data formatting scheme or mechanism may be used, the computer system 24, for example, may send any data (such as the query result 46 and the query state 130) using the JavaScript Object Notation (or JSON). Similarly, while the external service 20 may use any data formatting scheme or mechanism, the external service 20 may send any data using the JSON format. The query result 46 and the external service result 54, for example, may thus include or represent an array of JSON objects where all field values are strings. Moreover, to help troubleshooting efforts, requests may have the transit X-Correlation-ID header set to a random universal unique identifier (or UUID). This UUID may be logged by the distributed database service 32 and enables the database application 118 and/or human users to trace specific queries to specific requests to the external service 20. Standard HTTP compression mechanisms should be allowed for both requests and responses. To avoid overloading both the distributed database service 32 and the external service 20, size limits may be applied to both requests and responses (for example, a total count of database entries or at most 10 MB of uncompressed data). Moreover, to avoid errors, no two key-value parameter pairs may share the same name.

The computing cluster 30 calls the external service 20. The computing cluster 30 may have many computing nodes 28, perhaps hundreds or thousands of the computer systems 24. While any of the computer nodes/systems 28/24 may call the external service(s) 20, some nodes 28 may specialize and only be permitted to request particular external services 20. In the mapreduce database framework 80, for example, any mapper/worker node 28 (performing the mapper phase 82 and/or the worker role 124) may call any external service 20. Similarly, any reducer/coordinator/aggregator node 28 (performing the reducer phase 84 and/or the coordinator role 122) may call any external service 20. However, the distributed database service 32 may impose request or service restrictions that only permit or authorize the reducer/coordinator/aggregator node 28 (performing the reducer phase 84 and/or the coordinator role 122) to call any external service 20. For the external functions functionality, users need some way to make one or more remote procedure calls 150 out to at least one external service 20. These remote procedure calls 150 need to be able to specify parameters and take arguments that are passed to the external service's procedure. With the need for multiple procedures, the distributed database service 32 may need some way to flexibly provide multiple parameters, multiple targets (procedures), and possibly have multiple external functions (such as 160-164). The distributed database service 32 may thus prohibit mapper/worker nodes 28 (performing the mapper phase 82 and/or the worker role 124) from contacting/requesting the external services 20. For example, the mapper nodes 28 process huge amounts of database entries/data (potentially hundreds of millions if not billions). Such massive amounts of data puts significant strain on the external service(s) 20, is/are very slow to send over communications networks, and requires a tremendous amount of effort to ensure that the mapper pipelines do not grind to a halt due to waiting for external responses. Moreover, given that the computing cluster 30 may have many mapper nodes 28, with each mapper node 28 sending huge amounts of data (perhaps terabytes) through multiple requests, the mapper nodes 28 could potentially cause a distributed denial-of-service (DDoS) at the external service 20. For at least these reasons, then, the distributed database service 32 may ensure that the external procedure calls 150 all happen after the first aggregate function, meaning that the RPCs 150 run solely on the coordinator node 28 (performing the coordinator role 122 and/or reducer phase 84). The distributed database service 32 may thus use a recognizable language construct that to ensure RPCs 150 issue after the initial aggregator.

The protocol 152 for the remote procedure call(s) 150 may specify any rules for data communications. That is, the protocol 152 may specify any syntax, semantics, and timing. The syntax refers to the structure, order, and/or format of the data. The syntax may further specify multiple target procedures of the same external service 20. The semantics refers to the meaning of sections/fields of bits and actions taken, and provides any number of parameters/arguments to the external service 20. Indeed, the protocol 152 abstracts away the fact that it is an external/remote procedure. The timing specifies the data that should be sent and how fast the data can be sent. The protocol 152 may thus specify a syntax where all external services 20 (such as the functions 160-164) utilize a single function (e.g., RPC 150) that looks up the external service provider's specific function entity based on the argument provided to a functional name parameter. The external service 20 may then accept arguments based on the parameters specified in the function entity. Any language service provider (or LSP) analysis provider is expanded to resolve the entity and provide suggestions based on the entity. In the entity, the users specify the function name, the external service 20 to post to, the function parameters and the function parameter types along with the kind of function it is. An example of a configured function is the following rpc("tqlmap", pid=ContextProcessId, expr="parent parent child*", outputtypes="flatten").

Indeed, entities allow functional integration. Any external function may be expressed/integrated a first-order function in the domain language associated with the distributed database 40.

Entity examples are provided. The function entity may have the following required fields at first:

name—the name of the function, i.e., the name that combined with the namespace makes up the function identifier;
    parameters—a list of parameter names and types, where type denotes the type of the value that the parameter expects to receive as an argument (the list can be empty);
    serviceURL—The base URL of the external service 20 that this function interacts with;
    description—a user-provided description of what the function does; and
    kind—one of the general function 160, the source function 162, or the enrichment function 164.

This list of fields can be further expanded with additional fields, such as, for example, an authentication field to specify the authentication to use with the external service 20.

Parameter types may be specified. Functions may have primitive types, such as field, string, long minimum (optional and determines the minimum allowed value for the argument), long maximum (optional and determines the maximum allowed value for the argument), double minimum (optional and determines the minimum allowed value for the argument), and double maximum (optional and determines the maximum allowed value for the argument). Functions may have compound types, such as array[T] having a minimum length (optional integer that specifies the minimum expected length of the array) and where T is any of the aforementioned primitive types. Furthermore, all parameters may have an optional defaultValue field of the argument to use if none is given. If defaultValue is not set, the parameter demands user input.

Using the above typing scheme, an example of the entity specification may be written as graphmap(pid=myField, expr="some expression"), and explained as name: "graphmap"
    parameters:
        pid: myField
        expr: some expression
        outputtypes: String
    default Value: "flatten"
    serviceURL: "https://graphmap.ow.cicd.dc/"
    description: "Runs Graph expression given in 'expr' for the PID given in 'pid' and presents it in the manner given in 'outputtypes'."
    kind: Enrichment Again, entities allow functional integration. Any function may be expressed/integrated a first-order function in the domain language associated with the distributed database 40. The entity specification may thus further include or show suggestions for that particular function and its fields (such as via LSP). Likewise, entity specification allows an expression to state the function kind and allows optimizations for each given type.

The distributed database service 32 may implement application programming interfaces (or APIs). The database application 118 may utilize APIs to access the external service 20. Entities may thus be created using APIs. Data fields may specifically identify an endpoint for setting up external functions. The external service 20 may also use APIs to access the distributed database service 32 (such as sending the external service result 54).

Minimal changes may be needed. The distributed database service 32 may utilize any engine/compiler interface design. A query execution engine is changed, and a format of an output from the query compiler is changed. Query functionality for annotating (and in some scenarios, wholesale replacing) database search results with data from external source services 20 is desired. The distributed database service 32 allows the external services 20 to be added as steps allowed past the first aggregator—which means a) that the amounts of data to be sent to external annotation will be limited and b) that invocation of the annotator external service 20 only happens from the query-coordinating node 28 (performing the coordinator role 122 and reduced phase 84). The primary reason for the changes in this area is that callouts to external annotation sources are asynchronous in nature and therefore may not happen in a synchronous result-pipeline. As an example, AKKA® thread pools may be utilized by any logging service (such as CROWD-STRIKE FALCON LOGSCALE®). Any attempt to hide the call-out within a function with unchanged API may result in tying up AKKA® threads for seconds at a time, which is unacceptable as the AKKA® thread pool is also being used for all HTTP requests. If the distributed database service 32 blocked these, then a non-responding http layer is quickly produced and then the cluster 30 may be down. Apart from the fact that the asynchronous steps need to be explicitly visible to the engine (such as the database application 118), the engine should be aware of which external services 20 are invoked (and perhaps monitor timings and error rates, among other things) to avoid overloading those external systems. Indeed, the problem of blocking threads is the same given any other HTTP server framework (such as, for example, the NETTY® framework and the DJANGO® framework).

The primary interface between the compiler and the engine may consist of the traits mapper and reducer. The relevant parts of reducer (e.g., the coordinator role 122 and/or the reducer phase 84) may be a reduction omitter. The current result-pipeline is thus, viewed from an engine perspective, a single step from aggregation-state to a result (which contains the list of rows, entries, events, or other output search results along with some metadata, such as state result). This needs to change into a flow with a variable number of asynchronous steps, such as State X async X . . . async Result, noting that the underlying query may contain more than just the call-out steps, for instance Agg|Filter|Call-out|Filter|Agg|Filter|Call-out|Filter|Agg-
        |Filter.

The distributed database service 32 may utilize query dependencies. Each query, in other words, may have derived metadata describing any external (non-repo) inputs to the computation which a query is. External functions are very much such external inputs, and should be included in the query dependencies. Looking at the effect on some places where query dependencies play in such as:

query state cache—since the query states depend on only the part of the query up to and including the first aggregator, and given that call-out functions are not allowed there, the new feature should not affect the query state cache and its caching policies;

multi-cluster search—given that only the mapper parts (the part of the query up to and including the first aggregator) is sent to other clusters, there should be no effects here either; and query session reuse.

Examples of nodal configurations are also provided. An example of the remote procedure call 150 may resemble EXTERNAL_CALL_SERVICE_URL=https://excal-l.ow.cs.com: 8080

EXTERNAL_CALL_SERVICE_TIMEOUT_SEC=30

This remote procedure call 150 references the external service 20 as URL=https://excall.ow.cs.com: 8080 with a thirty (30) second timeout. The calling computing node 28 may authenticate as a client towards the external service 20 using the basic access authentication. This scheme offers a simple pre-agreed username/password authentication. The credentials may be transmitted in plain text, so the authentication may be combined with HTTP, HTTPS, or other protocol. The credentials are configured using the environment variables EXTERNAL_CALL_BASIC_AUTH_USERNAME and

EXTERNAL_CALL_BASIC_AUTH_PASSWORD, where the password is a secret string type that is not logged as part of the configuration. Examples may include:

EXTERNAL_CALL_BASIC_AUTH_USERNAME= someuser; and

EXTERNAL_CALL_BASIC_AUTH_PASSWORD= thepassword.

Computer functioning is greatly improved. The external services 20 may only be available to coordinator roles 122 executing the reducer phase 84 within the mapreduce database framework 80. The computer systems/nodes 24/28 acting as the coordinator role 122 (during the reducer phase 84) process far less database data that worker roles 124 executing the mapper phase 82. By limiting the remote procedure call 150 to the reducer phase 84, less database data must be stored (at least temporarily) by the memory device 114. The hardware processor 110 requires much less processor cycles and consumes much less electrical power. Moreover, much less data is transmitted to/from the communications network 26, so network packet congestion is greatly reduced. The distributed database service 32 thus executes and completes the external service 20 with reduced response times for faster and improved database search results.

The remote procedure call 150 may utilize any scheme, architecture, or mechanism. The remote procedure call 150 invokes the external service 20 as programming code separate from and/or unaffiliated with the code representing the distributed database service 32. The remote procedure call 150, for example, may use network calls and HTTP protocols. The remote procedure call 150, though, may run another local computer thread (such as locally running another program on the computer system 24) and have them talk together through the computer system 24. The remote procedure call 150, as another example, may make a web circuit connection over the communications network 26, but the web circuit connection may use a different protocol. The protocol 152 (as earlier explained) may use HTTP protocols and TTP. The remote procedure call 150, though, may open other circuits, although additional security issues may arise. The remote procedure call 150, as another example, may communicate a file. So, a program could write to a file, lock that file, and write to it, and then the distributed database service 32 could read it, or another program could read it, and based on the information contained within, then do an operation right to the file, and then communicate that file back and forth with the external service 20. Moreover, as yet another example, the distributed database service 32 may ingest and draw data, data replication adds cost. The remote procedure call 150 is agnostic to its scheme, architecture, or mechanism.

FIG. 17 illustrates examples of a method or operations that outsource the external service 20. The computer system 24 outsources the final query result 46 generated by the distributed database network 22 to the external service provider 50 that provides the external service 20 (Block 200). The computer system 24 receives the external service result 54 generated by the external service 20 using the final query result 46 generated by the distributed database network 22 (Block 202).

FIG. 18 illustrates more examples of a method or operations that outsource the external service 20. The computer system 24 outsources the query result 46 generated by the reducer phase 84 associated with the mapreduce database framework 80 to the external service provider 50 that provides the external service 20 (Block 210). The computer system 24 receives the external service result 54 generated by the external service 20 using the query result 46 generated by the reducer phase 84 associated with the mapreduce database framework 80 (Block 212).

FIG. 19 illustrates more examples of a method or operations that outsource the third party external service 20. The query state 130 generated by the reducer phase 84 associated with the mapreduce database framework 80 is outsourced using the remote procedure call 150 to the third party service provider 50 that provides the third party external service 20 (Block 220). The external service result 54 generated by the third party external service 20 using the query state 130 generated by the reducer phase 84 associated with the mapreduce database framework 80 is received (Block 222).

Figure 20:
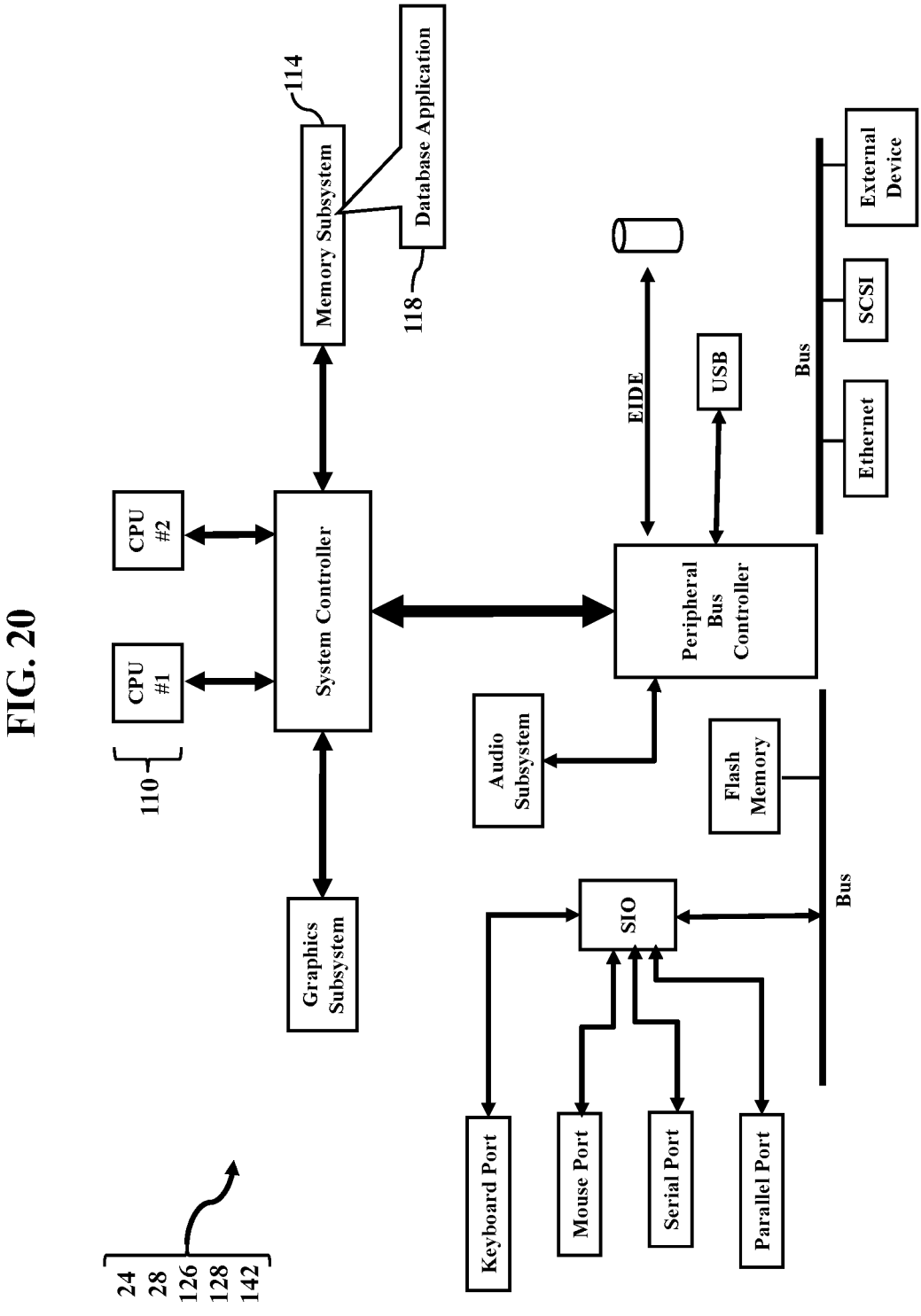
FIG. 20 illustrates a more detailed example of the operating environment.

FIG. 20 illustrates a more detailed example of the operating environment. FIG. 20 is a more detailed block diagram illustrating the computer system 24. The computer system 24 may represent the computer node 28, the coordinator server 126, the worker server 128, and the smartphone 142. The database application 118 is stored in the memory subsystems or devices 114. One or more of the processors 110 communicate with the memory subsystem or device 114 and execute the database application 118. Examples of the memory subsystem or device 114 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 24 is known to those of ordinary skill in the art, no detailed explanation is needed.

The computer system 24 may have any embodiment. This disclosure mostly discusses the computer system 24 as the computer node 28, the coordinator server 126, the worker server 128, and the smartphone 142. The distributed database service 32, the mapreduce database framework 80, and/or the remote procedure call 150, however, may be easily adapted to other operating environments, such as a switch, router, or any other network member of the computing cluster 30. The distributed database service 32, the mapreduce database framework 80, and/or the remote procedure call 150 may also be easily adapted to other devices, such as where the computer system 24 may be a laptop computer, a tablet computer, or a smartwatch. The distributed database service 32, the mapreduce database framework 80, and/or the remote procedure call 150 may also be easily adapted to other embodiments of smart devices, such as a television, an audio device, a remote control, and a recorder. The distributed database service 32, the mapreduce database framework 80, and/or the remote procedure call 150 may also be easily adapted to still more smart appliances, such as washers, dryers, and refrigerators. Indeed, as cars, trucks, and other vehicles grow in electronic usage and in processing power, the distributed database service 32, the mapreduce database framework 80, and/or the remote procedure call 150 may be easily incorporated into any vehicular controller.

Any examples may be applied regardless of the networking environment. The distributed database service 32, the mapreduce database framework 80, and/or the remote procedure call 150 may be easily adapted to stationary or mobile devices having wide-area networking (e.g., 4G/LTE/ 5G cellular), wireless local area networking (WI-FI®), near field, and/or BLUETOOTH® capability. The distributed database service 32, the mapreduce database framework 80, and/or the remote procedure call 150 may be applied to stationary or mobile devices utilizing any portion of the electromagnetic spectrum and any signaling standard (such as the IEEE 802 family of standards, GSM/CDMA/TDMA or any cellular standard, and/or the ISM band). The distributed database service 32, the mapreduce database framework 80, and/or the remote procedure call 150, however, may be applied to any processor-controlled device operating in the radio-frequency domain and/or the Internet Protocol (IP) domain. The distributed database service 32, the mapreduce database framework 80, and/or the remote procedure call 150 may be applied to any processor-controlled device utilizing a distributed computing network, such as the Internet (sometimes alternatively known as the "World Wide Web"), an intranet, a local-area network (LAN), and/or a wide-area network (WAN). The distributed database service 32, the mapreduce database framework 80, and/or the remote procedure call 150 may be applied to any processor-controlled device utilizing power line technologies, in which signals are communicated via electrical wiring. Indeed, the many examples may be applied regardless of physical componentry, physical configuration, or communications standard(s).

The computer system 24 may utilize any processing component, configuration, or system. For example, the distributed database service 32, the mapreduce database framework 80, and/or the remote procedure call 150 may be easily adapted to any desktop, mobile, or server central processing unit or chipset offered by INTEL®, ADVANCED MICRO DEVICES®, ARM®, APPLE®, TAIWAN SEMICON-DUCTOR MANUFACTURING®, QUALCOMM®, or any other manufacturer. The computer system 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The computer system 24 may use packetized communications. When the computer system 24 communicates via the communications network 26, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The communications network 26 may utilize any signaling standard. The communications network 26 and/or the computer cluster 30 may mostly use wired networks to interconnect the network members. However, the communications network 26 and/or the computer cluster 30 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/ CDMA/TDMA signaling standard. The communications network 26 and/or the computer cluster 30 may also utilize other standards, such as the I.E.E.E. 802 family of standards, the Industrial, Scientific, and Medical band of the electromagnetic spectrum, BLUETOOTH®, low-power or near-field, and any other standard or value.

The distributed database service 32, the mapreduce database framework 80, and/or the remote procedure call 150 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating the query state 56, as the above paragraphs explain.

The diagrams, schematics, illustrations, and the like represent conceptual views or processes illustrating examples of the distributed database service 32. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method that outsources a query state, comprising:
  receiving a database query specifying a third party website domain;
  generating the query state by querying a cluster of computer nodes performing a reducer phase and a mapper phase associated with a mapreduce database framework;
  after the query state is generated, executing a remote procedure call at a coordinator node of the cluster of the computer nodes that outsources the query state intercluster to the third party website domain unaffiliated with the mapreduce database framework that contractually provides a third party service based on the query state; and
  receiving by the coordinator node a service result generated by the third party service using the query state.

2. The method of claim 1, further comprising configuring a worker exclusion.

3. The method of claim 1, further comprising determining a service provider associated with the third party website domain.

4. The method of claim 1, further comprising outsourcing the query result to multiple third party services, each third party service of the multiple third party services associated with a corresponding third party service provider.

5. The method of claim 4, further comprising receiving multiple third party service results, each third party service result of the multiple third party service results generated by a corresponding one of the multiple third party services.

6. The method of claim 1, further comprising generating a database service result by the distributed database network using the service result.

7. At least one computer system that outsources a service query state, comprising:
  at least one central processing unit; and
  at least one memory device storing instructions that, when executed by the at least one central processing unit, perform operations, the operations comprising:
  receiving a database query specifying a third party website domain;
  generating the query state by querying a cluster of computer nodes performing a reducer phase and a mapper phase associated with a mapreduce database framework;
  after the query state is generated, executing a remote procedure call at a coordinator node of the cluster of the computer nodes that outsources the query state intercluster to the third party website domain unaffiliated with the mapreduce database framework that contractually provides a third party service based on the query state; and
  receiving by the coordinator node a service result generated by the third party service using the query state.

8. The at least one computer system of claim 7, wherein the operations further comprise exclusively assigning the executing of the remote procedure call to the coordinator role.

9. The at least one computer system of claim 7, wherein the operations further comprise prohibiting the executing of the remote procedure call to a worker role.

10. The at least one computer system of claim 7, wherein the operations further comprise sending the query result to a third party service provider.

11. The at least one computer system of claim 7, wherein the operations further comprise configuring a worker exclusion.

12. The at least one computer system of claim 7, wherein the operations further comprise sending the query state interdomain to a third party.

13. The at least one computer system of claim 7, wherein the operations further comprise generating, by the mapreduce database framework, a database service result using the service result.

14. The at least one computer system of claim 7, wherein the operations further comprise outsourcing the query state to multiple third party services, each third party service of the multiple third party services associated with a corresponding third party service provider.

15. The at least one computer system of claim 14, wherein the operations further comprise receiving multiple third party service results by the mapreduce database framework, each third party service result of the multiple third party service results generated by a corresponding one of the multiple third party services.

16. The at least one computer system of claim 15, wherein the operations further comprise generating, by the mapreduce database framework, a database service result using the multiple third party service results generated by the multiple third party services.

17. A memory device storing instructions that, when executed by at least one central processing unit, perform operations that outsource a query state, the operations comprising:
  receiving a database query specifying a third party website domain;
  generating the query state by querying a cluster of computer nodes performing a reducer phase and a mapper phase associated with a mapreduce database framework;
  after the query state is generated, executing a remote procedure call at a coordinator node of the cluster of the computer nodes that outsources the query state intercluster to the third party website domain unaffiliated with the mapreduce database framework that contractually provides a third party service based on the query state; and
  receiving by the coordinator node a service result generated by the third party service using the query state.

18. The memory device of claim 17, wherein the operations further comprise configuring a worker exclusion that restricts the remote procedure call to the coordinator role performing the reducer phase associated with the mapreduce database framework.

19. The memory device of claim 17, wherein the operations further comprise forbidding an access privilege associated with the remote procedure call to a worker role performing the mapper phase associated with the mapreduce database framework.

20. The memory device of claim 17, wherein the operations further comprise generating a database service result using the service result generated by the third party service.

* * * * *